United States Patent
Moore et al.

(10) Patent No.: US 10,565,769 B2
(45) Date of Patent: *Feb. 18, 2020

(54) SYSTEMS AND METHODS FOR ADDING VISUAL ELEMENTS TO VIDEO CONTENT

(71) Applicant: GoPro, Inc., San Mateo, CA (US)

(72) Inventors: Trey Moore, San Antonio, TX (US); Ross Chinni, San Mateo, CA (US); Nicholas D. Woodman, Woodside, CA (US); Meghan Laffey, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/272,122

(22) Filed: Feb. 11, 2019

(65) Prior Publication Data

US 2019/0172244 A1   Jun. 6, 2019

Related U.S. Application Data

(63) Continuation of application No. 15/802,751, filed on Nov. 3, 2017, now Pat. No. 10,204,437, which is a (Continued)

(51) Int. Cl.
*H04N 5/93* (2006.01)
*G06T 13/40* (2011.01)
(Continued)

(52) U.S. Cl.
CPC ............ *G06T 13/40* (2013.01); *G06F 3/0488* (2013.01); *G06F 3/04842* (2013.01);
(Continued)

(58) Field of Classification Search
USPC ........................................ 386/278, 280, 282
See application file for complete search history.

(56) References Cited

U.S. PATENT DOCUMENTS

| 5,130,794 A | 7/1992 | Ritchey |
| 6,337,683 B1 | 1/2002 | Gilbert |

(Continued)

FOREIGN PATENT DOCUMENTS

| WO | 2001020466 | 3/2001 |
| WO | 2009040538 A1 | 4/2009 |
| WO | 2010071996 A1 | 7/2010 |

OTHER PUBLICATIONS

Ernoult, Emeric, 'How to Triple Your YouTube Video Views with Facebook', SocialMediaExaminer.com, Nov. 26, 2012, 16 pages.
(Continued)

*Primary Examiner* — Nigar Chowdhury
(74) *Attorney, Agent, or Firm* — Esplin & Associates, PC

(57) ABSTRACT

A video may be presented on a touchscreen display. Reception of annotation input may be determined based on user's engagement with the touchscreen display. Annotation input may define an in-frame visual annotation for the video. In-frame visual annotation may be associated with a visual portion of the video and one or more points within a duration of the video such that a subsequent presentation of the video includes the in-frame visual annotation positioned at the visual portion of the video at the one or more points. A graphical user interface may be presented on the touchscreen display. The graphical user interface may include one or more animation fields that provide options for selection by the user. The options may define different properties of a moving visual element added to the video. The options may define visual characteristics, presentation periods, and motions of the moving visual element.

20 Claims, 23 Drawing Sheets

Related U.S. Application Data continuation of application No. 15/268,506, filed on Sep. 16, 2016, now Pat. No. 9,812,175.

(60) Provisional application No. 62/291,336, filed on Feb. 4, 2016.

(51) Int. Cl.

| | | |
|---|---|---|
| G11B 27/031 | (2006.01) | |
| G11B 27/34 | (2006.01) | |
| H04N 21/472 | (2011.01) | |
| H04N 21/4223 | (2011.01) | |
| H04N 21/4402 | (2011.01) | |
| G11B 27/02 | (2006.01) | |
| H04N 21/414 | (2011.01) | |
| H04N 21/422 | (2011.01) | |
| H04N 21/442 | (2011.01) | |
| G06F 3/0484 | (2013.01) | |
| G06F 3/0488 | (2013.01) | |
| G06F 17/24 | (2006.01) | |
| G11B 27/00 | (2006.01) | |

(52) U.S. Cl.
CPC ............ *G06F 17/241* (2013.01); *G11B 27/02* (2013.01); *G11B 27/031* (2013.01); *G11B 27/34* (2013.01); *H04N 21/41407* (2013.01); *H04N 21/4223* (2013.01); *H04N 21/42224* (2013.01); *H04N 21/4402* (2013.01); *H04N 21/44218* (2013.01); *H04N 21/47205* (2013.01)

(56) References Cited

U.S. PATENT DOCUMENTS

| | | |
|---|---|---|
| 6,593,956 B1 | 7/2003 | Potts |
| 7,222,356 B1 | 5/2007 | Yonezawa |
| 7,325,199 B1 | 1/2008 | Reid |
| 7,352,952 B2 | 4/2008 | Herberger |
| 7,483,618 B1 | 1/2009 | Edwards |
| 7,890,867 B1 | 2/2011 | Margulis |
| 8,446,433 B1 | 5/2013 | Mallet |
| 8,611,422 B1 | 12/2013 | Yagnik |
| 8,718,447 B2 | 5/2014 | Yang |
| 8,730,299 B1 | 5/2014 | Kozko |
| 8,763,023 B1 | 6/2014 | Goetz |
| 8,910,046 B2 | 12/2014 | Matsuda |
| 8,988,509 B1 | 3/2015 | Macmillan |
| 9,032,299 B2 | 5/2015 | Lyons |
| 9,036,001 B2 | 5/2015 | Chuang |
| 9,077,956 B1 | 7/2015 | Morgan |
| 9,111,579 B2 | 8/2015 | Meaney |
| 9,142,253 B2 | 9/2015 | Ubillos |
| 9,151,933 B2 | 10/2015 | Sato |
| 9,204,039 B2 | 12/2015 | He |
| 9,208,821 B2 | 12/2015 | Evans |
| 9,245,582 B2 | 1/2016 | Shore |
| 9,253,533 B1 | 2/2016 | Morgan |
| 9,317,172 B2 | 4/2016 | Lyons |
| 9,423,944 B2 | 8/2016 | Eppolito |
| 9,473,758 B1 | 10/2016 | Long |
| 9,479,697 B2 | 10/2016 | Aguilar |
| 9,557,885 B2 | 1/2017 | Moore |
| 9,564,173 B2 | 2/2017 | Swenson |
| 10,109,319 B2 | 10/2018 | Moore |
| 2004/0128317 A1 | 7/2004 | Sull |
| 2004/0216173 A1 | 10/2004 | Horoszowski |
| 2005/0025454 A1 | 2/2005 | Nakamura |
| 2005/0084232 A1 | 4/2005 | Herberger |
| 2006/0122842 A1 | 6/2006 | Herberger |
| 2006/0265657 A1 | 11/2006 | Gilley |
| 2007/0074115 A1 | 3/2007 | Patten |
| 2007/0173296 A1 | 7/2007 | Hara |
| 2007/0204310 A1 | 8/2007 | Hua |
| 2007/0230461 A1 | 10/2007 | Singh |
| 2008/0036917 A1 | 2/2008 | Pascarella |
| 2008/0044155 A1 | 2/2008 | Kuspa |
| 2008/0120550 A1 | 5/2008 | Oakley |
| 2008/0123976 A1 | 5/2008 | Coombs |
| 2008/0152297 A1 | 6/2008 | Ubillos |
| 2008/0163283 A1 | 7/2008 | Tan |
| 2008/0177706 A1 | 7/2008 | Yuen |
| 2008/0208791 A1 | 8/2008 | Das |
| 2008/0244410 A1 | 10/2008 | Schormann |
| 2008/0253735 A1 | 10/2008 | Kuspa |
| 2008/0313541 A1 | 12/2008 | Shafton |
| 2009/0037818 A1 | 2/2009 | Lection |
| 2009/0088143 A1 | 4/2009 | Kim |
| 2009/0089651 A1 | 4/2009 | Herberger |
| 2009/0213270 A1 | 8/2009 | Ismert |
| 2009/0274339 A9 | 11/2009 | Cohen |
| 2009/0327856 A1 | 12/2009 | Mouilleseaux |
| 2010/0045773 A1 | 2/2010 | Ritchey |
| 2010/0064219 A1 | 3/2010 | Gabrisko |
| 2010/0070878 A1* | 3/2010 | Amento ............... G11B 27/034 715/751 |
| 2010/0086216 A1 | 4/2010 | Lee |
| 2010/0104261 A1 | 4/2010 | Liu |
| 2010/0174993 A1 | 7/2010 | Pennington |
| 2010/0183280 A1 | 7/2010 | Beauregard |
| 2010/0231730 A1 | 9/2010 | Ichikawa |
| 2010/0245626 A1 | 9/2010 | Woycechowsky |
| 2010/0251295 A1 | 9/2010 | Amento |
| 2010/0275123 A1 | 10/2010 | Yu |
| 2010/0278504 A1 | 11/2010 | Lyons |
| 2010/0278509 A1 | 11/2010 | Nagano |
| 2010/0281375 A1 | 11/2010 | Pendergast |
| 2010/0281376 A1 | 11/2010 | Meaney |
| 2010/0281385 A1 | 11/2010 | Meaney |
| 2010/0281386 A1 | 11/2010 | Lyons |
| 2010/0287476 A1 | 11/2010 | Sakai |
| 2010/0299630 A1 | 11/2010 | McCutchen |
| 2010/0318660 A1 | 12/2010 | Balsubramanian |
| 2010/0321471 A1 | 12/2010 | Casolara |
| 2011/0025847 A1 | 2/2011 | Park |
| 2011/0069148 A1 | 3/2011 | Jones |
| 2011/0069189 A1 | 3/2011 | Venkataraman |
| 2011/0075990 A1 | 3/2011 | Eyer |
| 2011/0093798 A1 | 4/2011 | Shahraray |
| 2011/0134240 A1 | 6/2011 | Anderson |
| 2011/0173565 A1 | 7/2011 | Ofek |
| 2011/0206351 A1 | 8/2011 | Givoly |
| 2011/0211040 A1 | 9/2011 | Lindemann |
| 2011/0258049 A1 | 10/2011 | Ramer |
| 2011/0258547 A1 | 10/2011 | Symons |
| 2011/0276881 A1 | 11/2011 | Keng |
| 2011/0293250 A1 | 12/2011 | Deever |
| 2011/0320322 A1 | 12/2011 | Roslak |
| 2012/0014673 A1 | 1/2012 | O'Dwyer |
| 2012/0027381 A1 | 2/2012 | Kataoka |
| 2012/0030029 A1 | 2/2012 | Flinn |
| 2012/0057852 A1 | 3/2012 | Devleeschouwer |
| 2012/0079386 A1* | 3/2012 | Kim ...................... G06F 3/0485 715/720 |
| 2012/0123780 A1 | 5/2012 | Gao |
| 2012/0127169 A1 | 5/2012 | Barcay |
| 2012/0206565 A1 | 8/2012 | Villmer |
| 2012/0311448 A1 | 12/2012 | Achour |
| 2013/0024805 A1 | 1/2013 | In |
| 2013/0044108 A1 | 2/2013 | Tanaka |
| 2013/0058532 A1 | 3/2013 | White |
| 2013/0063561 A1 | 3/2013 | Stephan |
| 2013/0078990 A1 | 3/2013 | Kim |
| 2013/0127636 A1 | 5/2013 | Aryanpur |
| 2013/0136193 A1 | 5/2013 | Hwang |
| 2013/0142384 A1 | 6/2013 | Ofek |
| 2013/0145269 A1 | 6/2013 | Latulipe |
| 2013/0151970 A1 | 6/2013 | Achour |
| 2013/0166303 A1 | 6/2013 | Chang |
| 2013/0191743 A1 | 7/2013 | Reid |
| 2013/0195429 A1 | 8/2013 | Fay |
| 2013/0197967 A1 | 8/2013 | Pinto |
| 2013/0208134 A1 | 8/2013 | Hamalainen |

(56) References Cited

U.S. PATENT DOCUMENTS

| | | |
|---|---|---|
| 2013/0208942 A1 | 8/2013 | Davis |
| 2013/0215220 A1 | 8/2013 | Wang |
| 2013/0227415 A1 | 8/2013 | Gregg |
| 2013/0259399 A1 | 10/2013 | Ho |
| 2013/0263002 A1* | 10/2013 | Park ............... G06F 3/0484 715/719 |
| 2013/0283301 A1 | 10/2013 | Avedissian |
| 2013/0287214 A1 | 10/2013 | Resch |
| 2013/0287304 A1 | 10/2013 | Kimura |
| 2013/0300939 A1 | 11/2013 | Chou |
| 2013/0308921 A1 | 11/2013 | Budzinski |
| 2013/0318443 A1 | 11/2013 | Bachman |
| 2013/0343727 A1 | 12/2013 | Rav-Acha |
| 2014/0023341 A1 | 1/2014 | Wang |
| 2014/0026156 A1 | 1/2014 | Deephanphongs |
| 2014/0043340 A1 | 2/2014 | Sobhy |
| 2014/0064706 A1 | 3/2014 | Lewis, II |
| 2014/0072285 A1 | 3/2014 | Shynar |
| 2014/0093164 A1 | 4/2014 | Noorkami |
| 2014/0096002 A1 | 4/2014 | Dey |
| 2014/0105573 A1 | 4/2014 | Hanckmann |
| 2014/0157303 A1* | 6/2014 | Jo ............... H04N 21/4126 725/32 |
| 2014/0161351 A1 | 6/2014 | Yagnik |
| 2014/0165119 A1 | 6/2014 | Liu |
| 2014/0169766 A1 | 6/2014 | Yu |
| 2014/0176542 A1 | 6/2014 | Shohara |
| 2014/0179259 A1 | 6/2014 | Liu |
| 2014/0181666 A1 | 6/2014 | Moore |
| 2014/0193040 A1 | 7/2014 | Bronshtein |
| 2014/0212107 A1 | 7/2014 | Saint-Jean |
| 2014/0219634 A1 | 8/2014 | McIntosh |
| 2014/0226953 A1 | 8/2014 | Hou |
| 2014/0232818 A1 | 8/2014 | Carr |
| 2014/0232819 A1 | 8/2014 | Armstrong |
| 2014/0245336 A1 | 8/2014 | Lewis, II |
| 2014/0300644 A1 | 10/2014 | Gillard |
| 2014/0328570 A1 | 11/2014 | Cheng |
| 2014/0341528 A1 | 11/2014 | Mahate |
| 2014/0366052 A1 | 12/2014 | Ives |
| 2014/0376876 A1 | 12/2014 | Bentley |
| 2015/0015680 A1 | 1/2015 | Wang |
| 2015/0022355 A1 | 1/2015 | Pham |
| 2015/0029089 A1 | 1/2015 | Kim |
| 2015/0058709 A1 | 2/2015 | Zaletel |
| 2015/0085111 A1 | 3/2015 | Lavery |
| 2015/0154452 A1 | 6/2015 | Bentley |
| 2015/0178915 A1 | 6/2015 | Chatterjee |
| 2015/0186073 A1 | 7/2015 | Pacurariu |
| 2015/0220504 A1 | 8/2015 | Bocanegra Alvarez |
| 2015/0254871 A1 | 9/2015 | Macmillan |
| 2015/0256746 A1 | 9/2015 | Macmillan |
| 2015/0256808 A1 | 9/2015 | Macmillan |
| 2015/0271483 A1 | 9/2015 | Sun |
| 2015/0287435 A1 | 10/2015 | Land |
| 2015/0294141 A1 | 10/2015 | Molyneux |
| 2015/0318020 A1 | 11/2015 | Pribula |
| 2015/0339324 A1 | 11/2015 | Westmoreland |
| 2015/0350737 A1* | 12/2015 | Anderson ....... H04N 21/47205 348/564 |
| 2015/0375117 A1 | 12/2015 | Thompson |
| 2015/0382083 A1 | 12/2015 | Chen |
| 2016/0005435 A1 | 1/2016 | Campbell |
| 2016/0005440 A1 | 1/2016 | Gower |
| 2016/0026874 A1 | 1/2016 | Hodulik |
| 2016/0027470 A1 | 1/2016 | Newman |
| 2016/0027475 A1 | 1/2016 | Hodulik |
| 2016/0029105 A1 | 1/2016 | Newman |
| 2016/0055885 A1 | 2/2016 | Hodulik |
| 2016/0088287 A1 | 3/2016 | Sadi |
| 2016/0098941 A1 | 4/2016 | Kerluke |
| 2016/0119551 A1 | 4/2016 | Brown |
| 2016/0217325 A1 | 7/2016 | Bose |
| 2016/0225405 A1 | 8/2016 | Matias |
| 2016/0225410 A1 | 8/2016 | Lee |
| 2016/0234345 A1 | 8/2016 | Roberts |
| 2016/0247535 A1 | 8/2016 | Latulipe |
| 2016/0358603 A1 | 12/2016 | Azam |
| 2016/0366330 A1 | 12/2016 | Boliek |
| 2017/0006214 A1 | 1/2017 | Andreassen |
| 2017/0062016 A1 | 3/2017 | Samra |
| 2017/0242504 A1 | 8/2017 | Hanson |
| 2017/0256288 A1 | 9/2017 | Ai |

OTHER PUBLICATIONS

FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>.

FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.

FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.

Han et al., 'Deep Compression: Compressing Deep Neural Networks with Pruning, Trained Quantization and Huffman Coding, International Conference on Learning Representations 2016, 14 pgs.

He et al., 'Deep Residual Learning for Image Recognition,' arXiv:1512.03385, 2015,12 pgs.

Iandola et al., 'SqueezeNet: AlexNet-level accuracy with 50x fewer parameters and <0.5MB model size', arXiv:1602.07360v3 [cs.CV] Apr. 6, 2016 (9 pgs.).

Ioffe et al., 'Batch Normalization: Accelerating Deep Network Training by Reducing Internal Covariate Shift,' arXiv:1502.03167, 2015, 11 pgs.

Parkhi et al., 'Deep Face Recognition,' Proceedings of the British Machine Vision, 2015,12 pgs.

PCT International Preliminary Report on Patentability for PCT/US2015/023680, dated Oct. 4, 2016, 10 pages.

PCT International Search Reort for PCT/US15/18538 dated Jun. 16, 2015 (2 pages).

PCT International Search Report and Written Opinion for PCT/US15/12086 dated Mar. 17, 2016, 7 pages.

PCT International Search Report and Written Opinion for PCT/US15/18538, dated Jun. 16, 2015, 26 pages.

PCT International Search Report and Written Opinion for PCT/US16/31076, dated Aug. 8, 2016, 19 pages.

PCT International Search Report for PCT/US15/23680 dated Aug. 3, 2015, 4 pages.

PCT International Search Report for PCT/US15/41624 dated Nov. 4, 2015, 5 pages.

PCT International Search Report for PCT/US17/16367 dated Apr. 14, 2017 (2 pages).

PCT International Written Opinion for PCT/US2015/041624, dated Dec. 17, 2015, 7 Pages.

Ricker, 'First Click: TomTom's Bandit camera beats GoPro with software' Mar. 9, 2016 URL: http://www.theverge.com/2016/3/9/11179298/tomtom-bandit-beats-gopro (6 pages).

Schroff et al., 'FaceNet: A Unified Embedding for Face Recognition and Clustering,' IEEE Conference on Computer Vision and Pattern Recognition (CVPR), 2016, 10 pgs.

Tran et al., 'Learning Spatiotemporal Features with 3D Convolutional Networks', arXiv:1412.0767 [cs.CV] Dec. 2, 2014 (9 pgs).

Yang et al., 'Unsupervised Extraction of Video Highlights via Robust Recurrent Auto-encoders' arXiv:1510.01442v1 [cs.CV] Oct. 6, 2015 (9 pgs).

Transmittal of the International Search Report and the Written Opinion of the International Searching Authority for PCTA US2012/050155 dated Oct. 22, 2012, 7 pages.

Transmittal of the International Preliminary Report on Patentability for PCT/US2012/050155 dated Feb. 20, 2014, 6 pages.

(56) References Cited

OTHER PUBLICATIONS

Anticipatory eye movements while watching continuous action across shots in video sequences by Kirkorian, Heather L (Year: 2017).

* cited by examiner

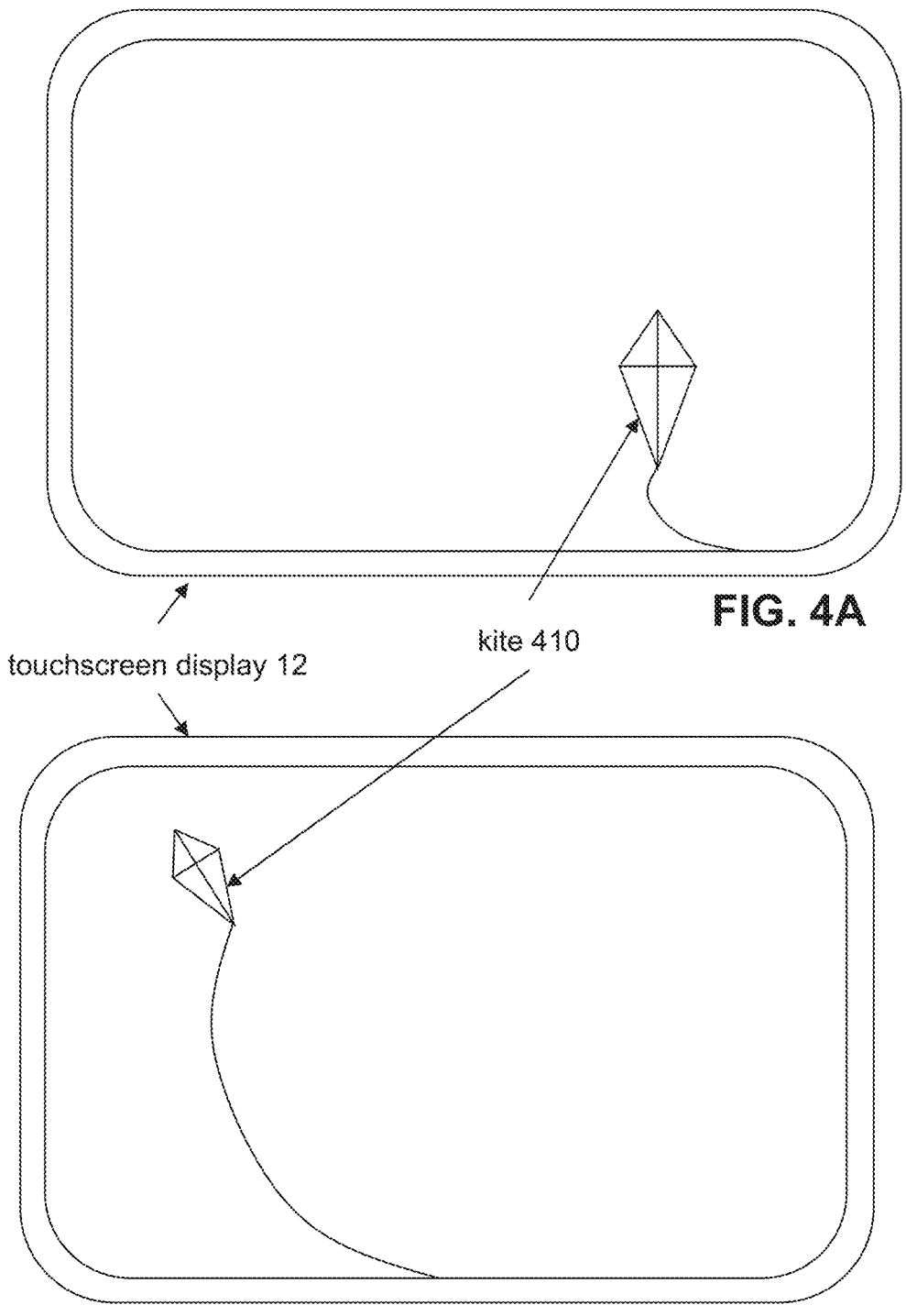

SYSTEMS AND METHODS FOR ADDING VISUAL ELEMENTS TO VIDEO CONTENT

FIELD

This disclosure relates to systems and methods that add visual elements to a video.

BACKGROUND

People may wish to add visual elements to a video. For example, people may wish to annotate a video and/or add moving visual elements to a video. Intuitively allowing people to add visual elements to a video may encourage people to view and edit videos.

SUMMARY

This disclosure relates to adding visual elements to a video. A video may be presented on a touchscreen display. In some aspects of the disclosure, reception of annotation input may be determined based on a location of a user's engagement with the touchscreen display. Annotation input may define an in-frame visual annotation for the video. In-frame visual annotation may be associated with a visual portion of the video and one or more points within a duration of the video such that a subsequent presentation of the video includes the in-frame visual annotation positioned at the visual portion of the video at the one or more points within the duration. In some aspects of the disclosure, a moving visual element may be added to a video. A graphical user interface may be presented on a touchscreen display. The graphical user interface may include one or more animation fields that provide options for selection by the user. The options may define different properties of the moving visual element. The options may define visual characteristics, presentation periods, and motions of the moving visual element.

A system that adds visual elements to a video may include one or more of a touchscreen display, a physical processor, and/or other components. The touchscreen display may include one or more devices that may present information visually. The touchscreen display may be configured to present video content and/or other information. Video content may refer to media content that includes one or more video and/or other media. Video content may have a duration. The touchscreen display may be configured to receive user input during presentation of the video content. User input may be received via one or more touch-sensitive screens of the touchscreen display. The touchscreen display may generate output signals indicating one or more locations of a user's engagement with the touchscreen display.

The physical processor(s) may be configured by machine-readable instructions. Executing the machine-readable instructions may cause the physical processor(s) to facilitate adding visual elements to video content. The machine-readable instructions may include one or more computer program components.

In some aspects of the disclosure, the system that adds visual elements to a video may facilitate annotating the video. Computer program components for such system(s) may include one or more of a presentation component, a reception component, an annotation component, a visual association component, a time association component, and/or other computer program components.

The presentation component may be configured to effectuate presentation of one or more video content and/or other information on the touchscreen display. The presentation component may effectuate presentation of the video content(s) with one or more in-frame visual annotations.

The reception component may be configured to determine reception of annotation input based on the location of the user's engagement with the touchscreen display and/or other information. The annotation input may define one or more in-frame visual annotations for the video content(s). The annotation input may be received at one or more points within the duration of the video content. The one or more points within the duration may define a moment or a period within the duration. In some implementations, the reception component may be configured to, in response to the reception of the annotation input, pause the presentation of the video content(s) on the touchscreen display.

The annotation component may be configured to, in response to the reception of the annotation input, generate one or more in-frame visual annotations. One or more in-frame visual annotations may be generated based on the annotation input and/or other information. In some implementations, one or more in-frame visual annotations may include one or more animations. In some implementations, one or more in-frame visual annotations may include one or more visual effects.

The user's engagement with the touchscreen display may include one or more lines, points, and/or other shapes drawn on the touchscreen display. In some implementations, the in-frame visual annotation(s) may include one or more lines, points, and/or other shapes drawn on the touchscreen display. In some implementations, the in-frame visual annotation(s) may include one or more stock visual elements selected based on one or more lines, points, and/or other shapes drawn on the touchscreen display, and/or other information.

The visual association component may be configured to, in response to the reception of the annotation input, associate one or more in-frame visual annotations with one or more visual portions of the video content(s). One or more in-frame visual annotations may be associated with one or more visual portions of the video content(s) based on the location(s) of the user's engagement with the touchscreen display and/or other information.

One or more visual portions of the video content(s) may include one or more objects. In some implementations, one or more objects may be moving with the duration of the video content. Associating one or more in-frame visual annotations with one or more visual portions of the video content(s) may include associating the in-frame visual annotation(s) with the object(s). The in-frame visual annotation(s) may be associated with the object(s) such that the in-frame visual annotation(s) move based on the movement(s) of the object(s) and/or other information.

In some implementations, one or more objects may have shapes that change within the duration. Associating one or more in-frame visual annotations with one or more visual portions of the video content(s) may include associating the in-frame visual annotation(s) with the object(s). The in-frame visual annotation(s) may be associated with the object(s) such that shape(s) of the in-frame visual annotation(s) change based on the shape(s) of the object(s) and/or other information.

The time association component may be configured to, in response to the reception of the annotation input, associate one or more in-frame visual annotations with one or more points within the duration of the video content. One or more in-frame visual annotations may be associated with one or more points within the duration such that a subsequent presentation of the video content may include one or more in-frame visual annotations at the one or more points within the duration. One or more in-frame visual annotations may be positioned at the associated visual portion(s) of the video content at the associated point(s) within the duration.

In some aspects of the disclosure, the system that adds visual elements to a video may facilitate adding a moving visual element to the video. Computer program components for such system(s) may include one or more of a presentation component, a generation component, a time period component, a motion component, and/or other computer program components.

The presentation component may be configured to effectuate presentation of one or more of video content, a graphical user interface, and/or other information on the touchscreen display. The presentation component may effectuate presentation of one or more moving visual elements with the video content(s). The moving visual elements may be presented at one or more periods within the duration of the video content. The moving visual elements may be characterized by one or more motions. In some implementations, the video content(s) may include one or more objects. The object(s) may be moving within the duration of the video content. The object(s) may be characterized by one or more movements.

A graphical user interface may facilitate interactions of a user with one or more animation fields via the user input. The animation fields may include one or more of a visual selection field, a time selection field, a motion selection field, and/or other selection fields. In some implementations, the animation fields may include an object motion selection field. In some implementations, the animation fields may include a distance selection field.

The visual selection field may present one or more visual characteristic options for selection by the user. Visual characteristic options may define different visual characteristics for one or more moving visual elements. Different visual characteristics for one or more moving visual elements may include one or more of a color, a size, a shape, a text, an image, a video, a visual effect, and/or other visual characteristics.

The time selection field may present one or more time period options for selection by the user. The time period options may define different periods within the duration in which the moving visual element(s) may be presented with the video content.

The motion selection field may present one or more motion options for selection by the user. The motion options may define different motions for the moving visual element(s). Different motions for the moving visual element(s) may include one or more of a predetermined path, a predetermined translational motion, a predetermined angular motion, a user-determined path, a user-determined translational motion, a user-determined angular motion, and/or other motions.

The object motion selection field may present one or more object motion options for selection by the user. The object motion options may define different motions for the moving visual element(s) based on the movement(s) of the object(s). In some implementations, different motions for the moving visual element(s) based on the movement(s) of the object(s) may include a follow motion for the moving visual element(s) to follow the object(s).

The distance selection field may present one or more distance options for selection by the user. The distance options may define different distances at which the moving visual element(s) follow the object(s).

The generation component may be configured to generate one or more moving visual elements. One or more moving visual elements may be generated based on one or more visual characteristic options selected by the user and/or other information. In some implementations, the moving visual element(s) may include one or more animations.

The user's engagement with the touchscreen display may include one or more lines, points, and/or other shapes drawn on the touchscreen display. In some implementations, the moving visual element(s) may be generated further based on one or more lines, points, and/or other shapes drawn on the touchscreen display. In some implementations, the moving visual element(s) may include one or more lines, points, and/or other shapes drawn on the touchscreen display. In some implementations, the moving visual element(s) may include one or more stock visual elements selected based on one or more lines, points, and/or other shapes drawn on the touchscreen display, and/or other information.

The time period component may be configured to determine one or more periods within the duration in which the moving visual element(s) may be presented with the video content. The period(s) within the duration may be determined based on one or more time period options selected by the user and/or other information.

The motion component may be configured to determine one or more motions for the moving visual element(s). The motion(s) for the moving visual element(s) may be determined based on one or more motion options selected by the user and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", and "the" include plural referents unless the context clearly dictates otherwise.

BRIEF DESCRIPTION OF THE DRAWINGS

FIGS. 4A-4B illustrate exemplary video content presented on a touchscreen display.

DETAILED DESCRIPTION

Figure 1A:
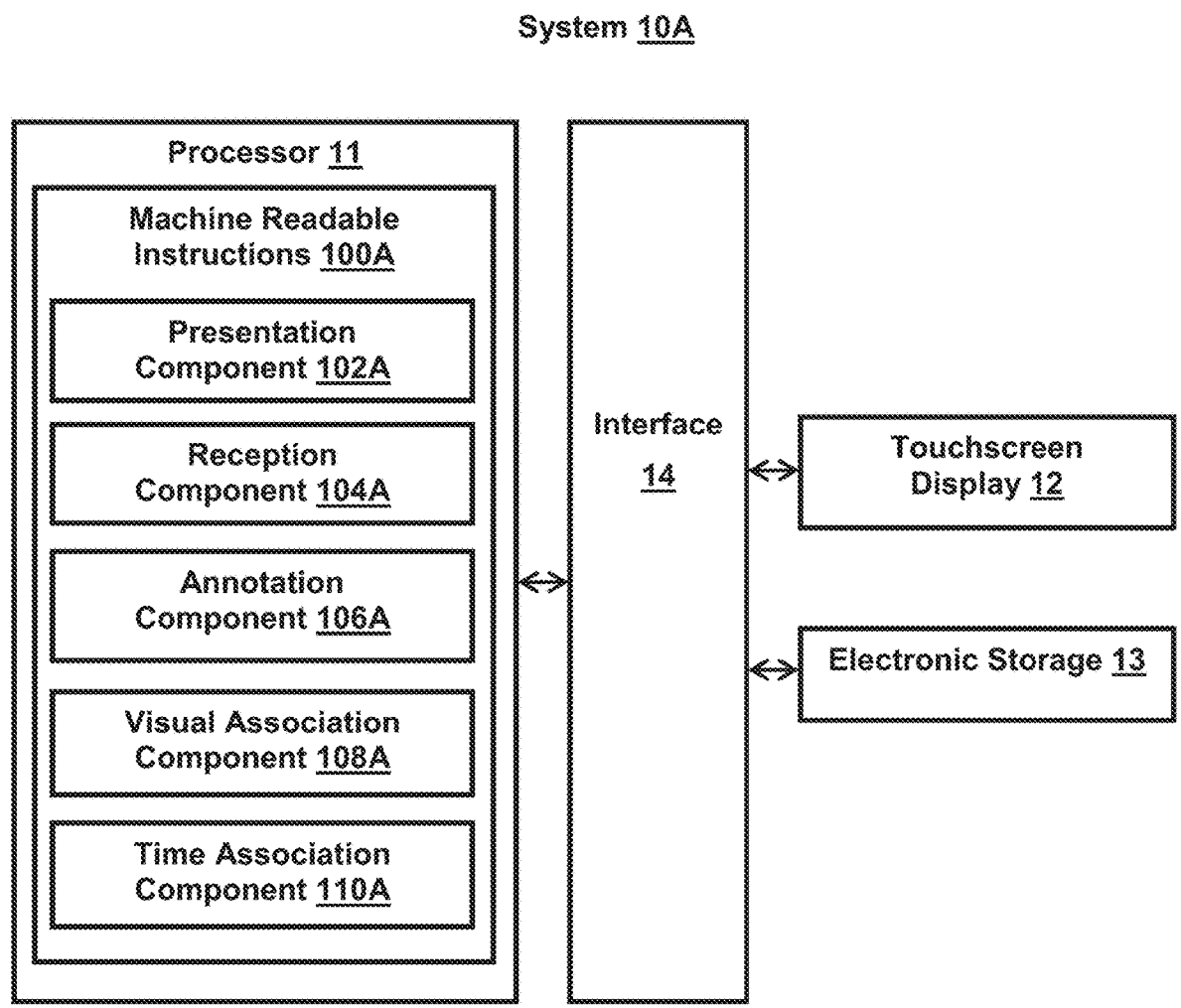
FIG. 1A illustrates a system for annotating video content.
Figure 1B:
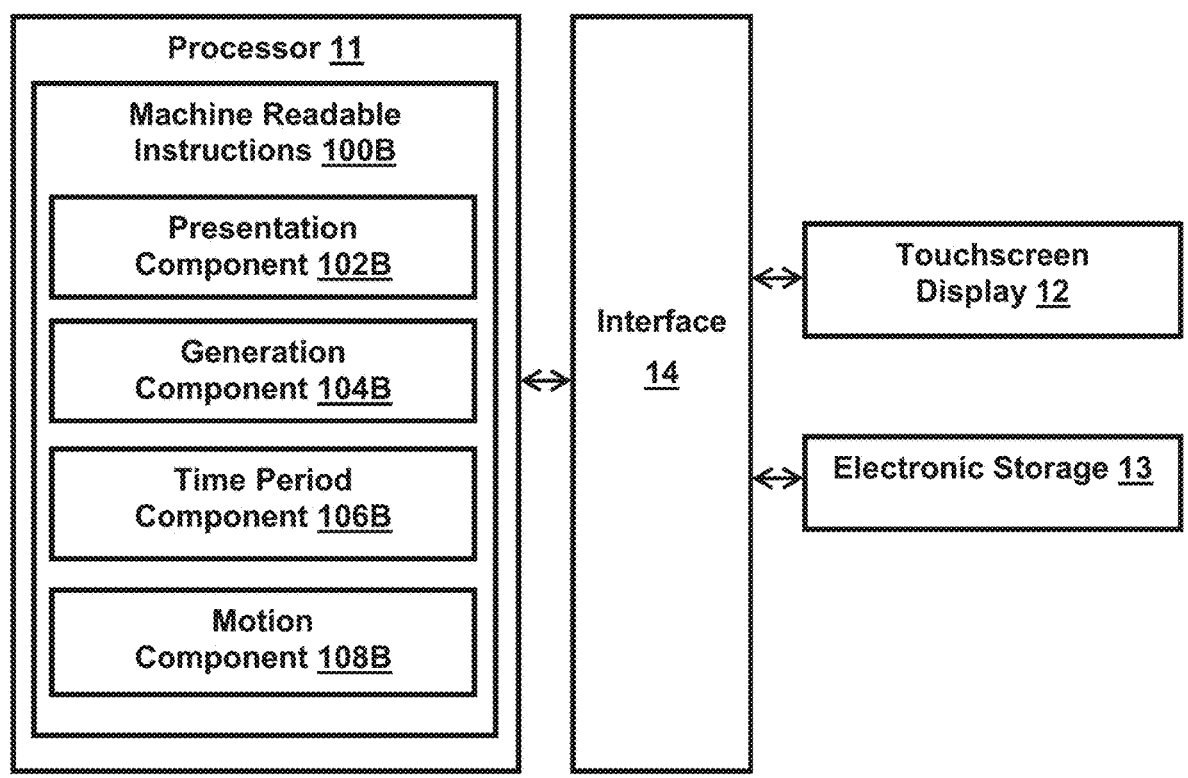
FIG. 1B illustrates a system for adding a moving visual element to video content.

FIGS. 1A-1B illustrate systems 10A, 10B for adding visual elements to video content. Systems 10A, 10B may include one or more of processor 11, touchscreen display 12, electronic storage 13, interface 14 (e.g., bus, wireless interface), and/or other components. Video content may be presented on touchscreen display 12. In some aspects of the disclosure, reception of annotation input may be determined based on a location of a user's engagement with touchscreen display 12. Annotation input may define an in-frame visual annotation for the video content. In-frame visual annotation may be associated with a visual portion of the video content and one or more points within a duration of the video content. A subsequent presentation of the video may include the in-frame visual annotation positioned at the visual portion of the video content at the one or more points within the duration. In some aspects of the disclosure, a moving visual element may be added to video content. A graphical user interface may be presented on touchscreen display 12. The graphical user interface may include one or more animation fields that provide options for selection by the user. The options may define different properties of the moving visual element. The options may define visual characteristics, presentation periods, and motions of the moving visual element.

Touchscreen display 12 may include one or more devices that may present information visually. Touchscreen display 12 may be configured to present video content and/or other information. Video content may refer to media content that includes one or more video and/or other media. Video content may have a duration. The duration may define a length of presentation time of the video content. Touchscreen display 12 may be configured to receive user input during presentation of the video content. User input may be received via one or more touch-sensitive screens of touchscreen display 12. Touchscreen display 12 may generate output signals indicating one or more locations of a user's engagement with touchscreen display 12.

Figure 3A:
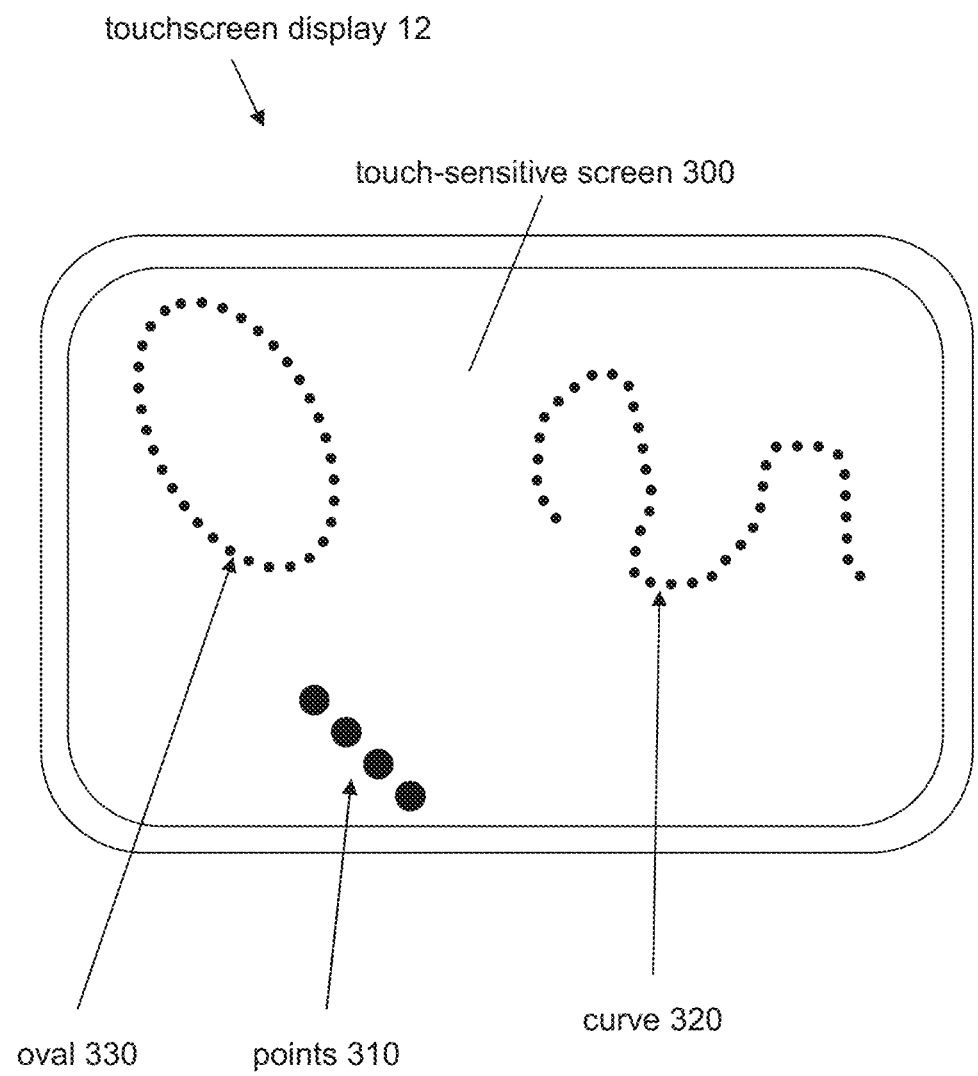
FIG. 3A illustrates exemplary user engagements with a touchscreen display.

FIG. 3A illustrates an exemplary configuration for touchscreen display 12. Touchscreen display 12 may include touch-sensitive screen 300. Users may engage with touchscreen display 12 by touching one or more portions of touch-sensitive screen 300 (e.g., with one or more fingers, stylus). A user may engage with touchscreen display 12 at a moment in time, at multiple moments in time, during a period, or during multiple periods. For example, a user may engage with touchscreen display 12 at four separate moments/periods in time to mark points 310 on touchscreen display 12. A user may engage with touchscreen display 12 during one or more periods of time to draw curve 320 on touchscreen display 12. A user may engage with touchscreen display 12 during one or more periods of time to draw oval 330 on touchscreen display 12. The user's motions to draw curve 320 and/or oval 330 may be one continuous motion or multiple motions (e.g., a user draws half of curve 320, stops, then draws the other half of curve 320). Other types of engagement of the touchscreen display 12 by the users are contemplated.

Figure 3B:
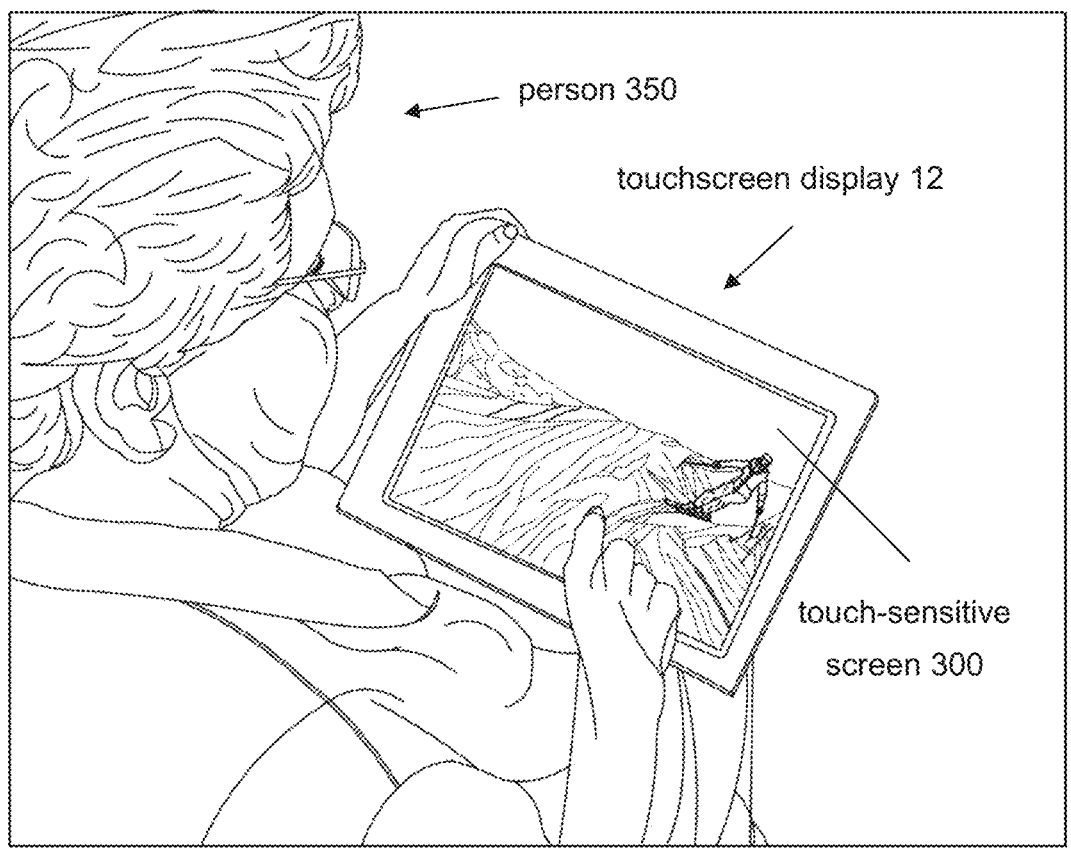
FIGS. 3B-3G illustrate exemplary use cases for annotating video content.
Figure 3C:
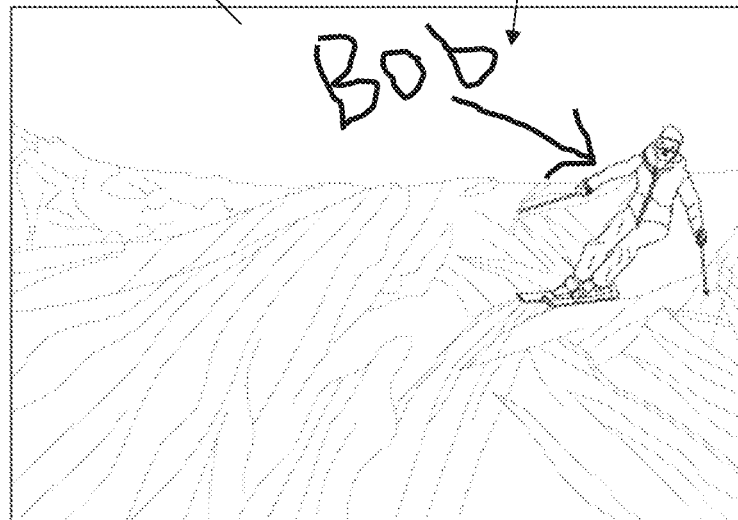

FIGS. 3B-3G illustrate exemplary use cases for adding visual elements to video content. In FIG. 3B, person 350 may engage with touchscreen display 12 via touch-sensitive screen 300 while watching a video of a skier. Person 350 may engage with touchscreen display 12 to add one or more visual elements to the video. For example, as shown in FIG. 3C, person 350 may add hand-drawn annotation 360 to the video. Hand-drawn annotation 360 may include an arrow and the skier's name (e.g., "Bob"). The arrow and the skier's name may be hand-drawn by person 350 via engagement with touchscreen display 12/touch-sensitive screen 300.

Figure 3D:
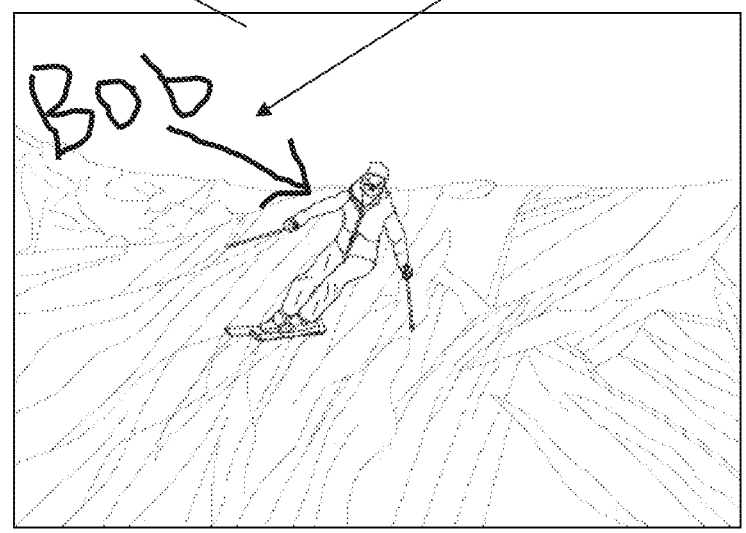

As shown in FIG. 3D, hand-drawn annotation 360 may follow the skier. In FIG. 3D, the skier may have moved left and down the slope. Hand-drawn annotation 360 may move left and down to keep a same relative position with respect to the skier.

Figure 3E:
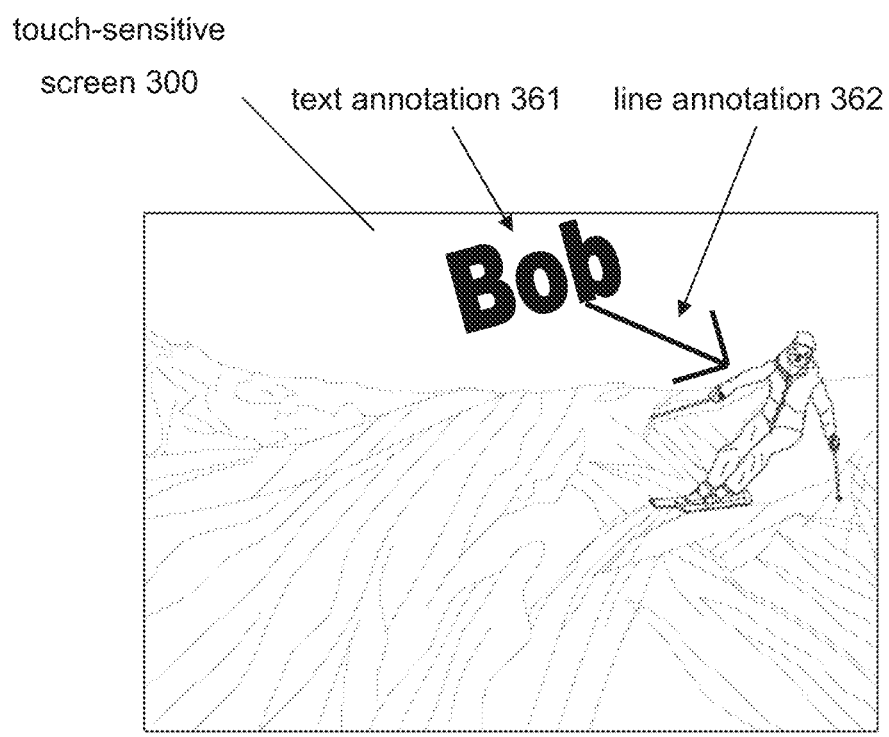

As shown in FIG. 3E, hand-drawn annotation 360 may be cleaned up. In FIG. 3E, hand-drawn annotation 360 (e.g., messy handwriting/drawing (chicken scratch) of person 350) may be cleaned up and replaced with text annotation 361 (e.g., "Bob") and line annotation 362 (e.g., arrow).

Figure 3F:
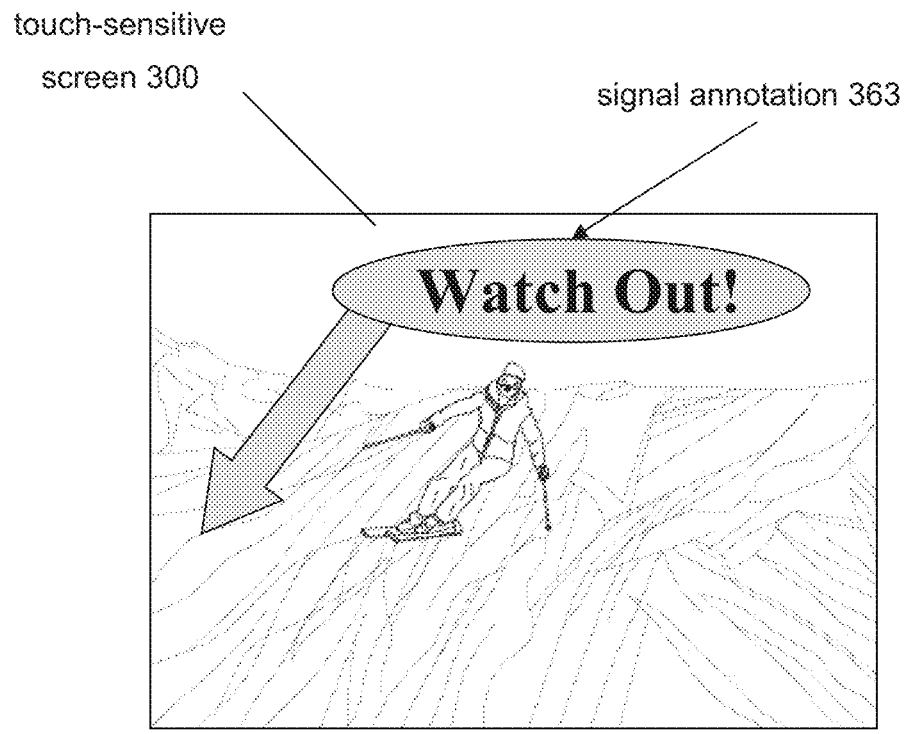

As shown in FIG. 3F, person 350 may add signal annotation 363 to the video. Signal annotation 363 may include a text "Watch Out!" in a bubble and an arrow pointing to a side of the video. As the video is played, another skier may cut across the path of the skier (shown in FIG. 3G) at the side of the video. Signal annotation 363 may disappear when the other skier appears. Other use cases for adding visual elements to video content are contemplated.

Electronic storage 13 may include electronic storage medium that electronically stores information. Electronic storage 13 may store software algorithms, information determined by processor 11, information received remotely, and/or other information that enables systems 10A, 10B to function properly. For example, electronic storage 13 may store information relating to video content, visual elements, annotations, motion of visual elements/annotations, presentation of visual elements/annotations, graphical user interface, animation fields, touchscreen display, user input, and/or other information.

Processor 11 may be configured to provide information processing capabilities in systems 10A, 10B. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 100A, 100E to facilitate adding visual elements to a video. Machine-readable instructions 100A, 100B may include one or more computer program components.

Referring to FIG. 1A, system 10A may facilitate annotating video content. Machine readable instructions 100A may include one or more of presentation component 102A, reception component 104A, annotation component 106A, visual association component 108A, time association component 110A, and/or other computer program components.

Presentation component 102A may be configured to effectuate presentation of one or more video content and/or other information on touchscreen display 12. Presentation component 102A may effectuate presentation of video content during the acquisition of the video content and/or after the acquisition of the video content by one or more capture devices (e.g., cameras). For example, video content may be defined by a spherical video capture using multiple cameras and presentation component 102A may present the video content as it is being captured by the multiple cameras. Presentation of the video content during the acquisition of the video content may allow a user to use system 10A to annotate the video content as the video content is being captured. Presentation of the video content after the acquisition of the video content may allow a user to use system 10A to annotate the video content after the video content has been captured.

FIGS. 4A-4B illustrate exemplary video content presented on touchscreen display 12. Video content may include kite 410 that moves during the duration of the video content. In FIG. 4A, touchscreen display 12 may present a frame of video content at a moment in which kite 410 is located at lower right visual portion of the video content. In FIG. 4B, touchscreen display 12 may present a frame of video content at a moment in which kite 410 is located at upper left visual portion of the video content. The frame of the video content shown in FIG. 4B may be subsequent in time duration to the frame of the video content shown in FIG. 4A (e.g., the video content includes kite 410 moving from lower right visual portion to the upper left visual portion of the video content).

Presentation component 102A may effectuate presentation of the video content(s) with one or more in-frame visual annotations. In-frame visual annotations may refer to one or more graphical and/or text elements that may be overlaid on and presented with video content. In-frame visual annotations may be inserted by a user during and/or after the capture of the video content. In some implementations, in-frame visual annotations may indicate an object, an action, and/or other visual characteristics within the video content. In some implementations, in-frame visual annotations may include texts and/or graphics indicating user interpretation of video content. In some implementations, in-frame visual annotations may include direction/guidance/signal provided by a user for the video content. Other uses of in-frame visual annotations are contemplated.

Figure 3G:
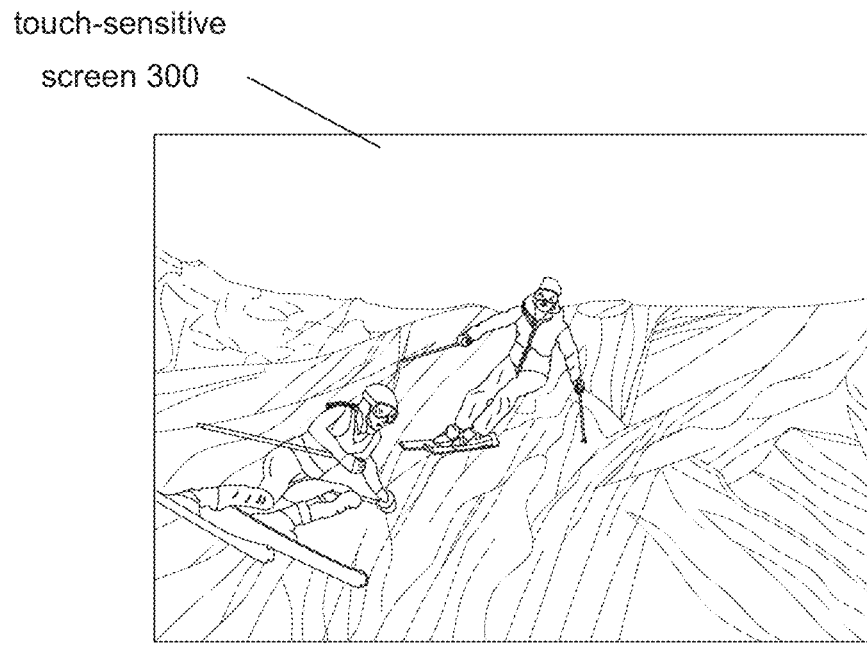

For example, as shown in FIGS. 3F-3G, an in-frame visual annotation may include a text "Watch Out!" in a bubble and an arrow pointing to a side of the video content. During the presentation of the video content, an object may appear in the video content at the point where the arrow is pointing (e.g., a skier may cuts across the path of another skier during the capture of the video content). In-frame visual annotations may be static or dynamic, and may be observable at a time, over a period of time, at a location, or over a range of locations. In-frame visual annotations may include one or more of an image, a video, and/or other in-frame visual annotations.

Figure 4C:
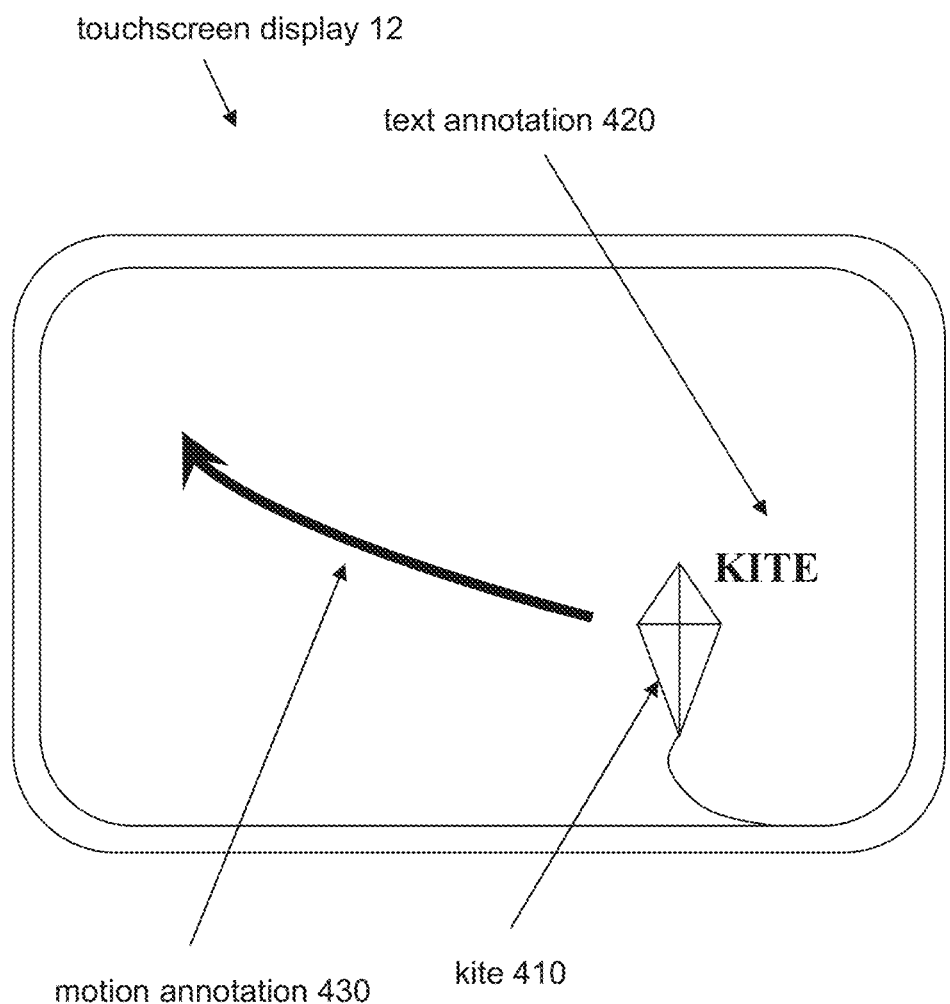
FIG. 4C illustrates exemplary video content presented with exemplary in-frame visual annotations on a touchscreen display.

FIG. 4C illustrates exemplary video content presented with exemplary in-frame visual annotations. In FIG. 4C, touchscreen display 12 may present a frame of video content at a moment in which kite 410 is located at lower right visual portion of the video content. The moment corresponding to the frame shown in FIG. 4C may be the same moment corresponding to the frame shown in FIG. 4A. Presentation component 102A may present the video content with text annotation 420, motion annotation 430, and/or other in-frame visual annotations. Text annotation 420 may display the word "KITE" next to kite 410. Motion annotation 430 may trace the movement of kite 410 within the video content. Other types of in-frame visual annotations are contemplated.

In some implementations, presentation component 102A may effectuate presentation of the video content(s) with one or more in-frame visual annotations at different zoom levels. Sizes of one or more in-frame visual annotation may change or may not change with different zoom levels for video content. Increase in zoom level (e.g., zooming in) for video content may increase the size of in-frame visual annotations. Decrease in zoom level (e.g., zooming out) for video content may decrease the size of in-frame visual annotations. Increase/decrease in zoom level for video content may not change the size of in-frame visual annotation.

Figure 4D:
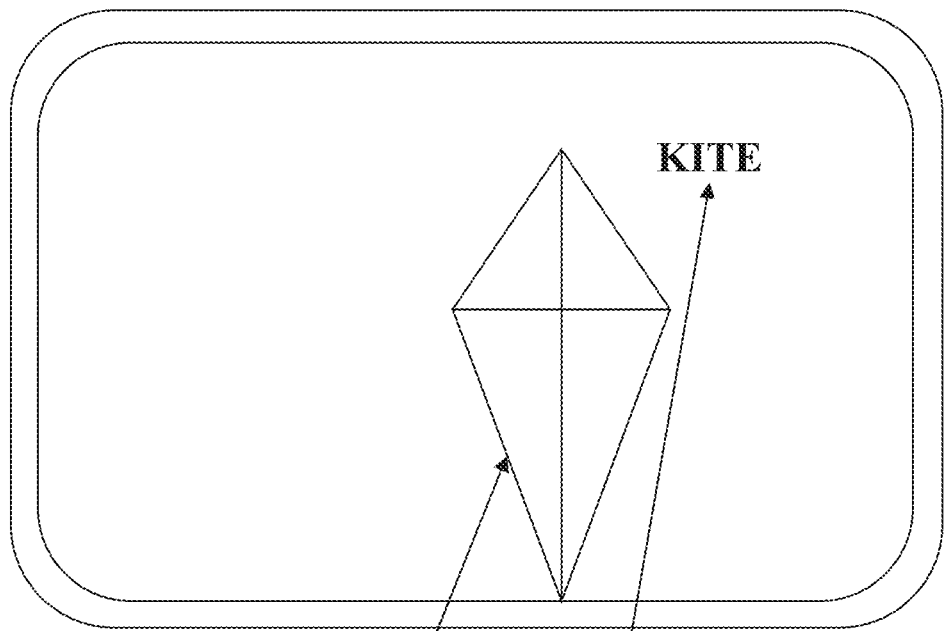
FIGS. 4D-4E illustrate exemplary in-frame visual annotations presented with different zooms on a touchscreen display.
Figure 4E:
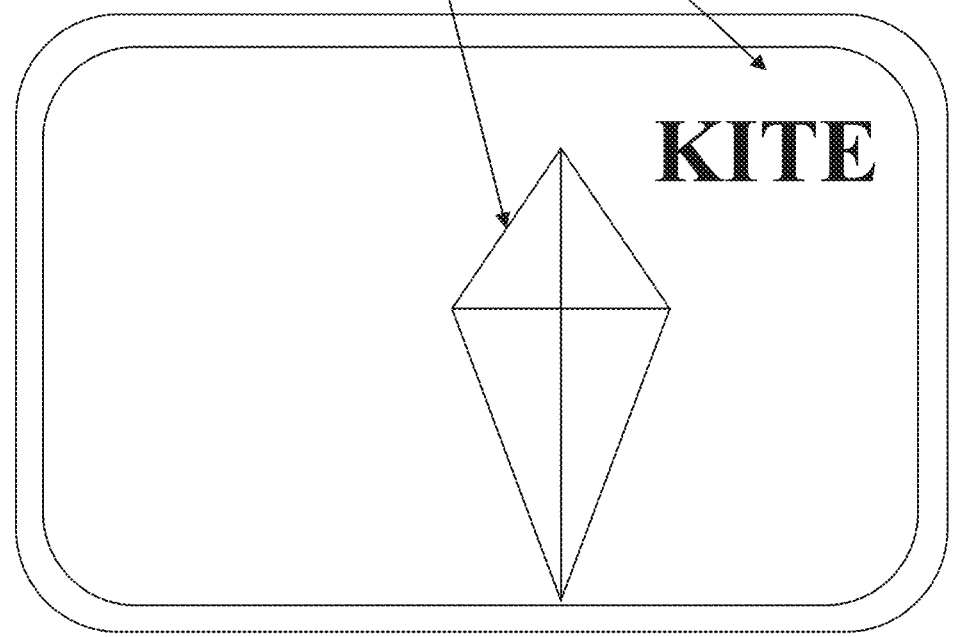

For example, FIG. 4C may represent presentation of video content at regular zoom (e.g., not zoomed in or zoomed out) with text annotation 420 and motion annotation 430. FIGS. 4D-4E illustrate exemplary in-frame visual annotations presented with different zoom levels. For example, FIGS. 4D-4E may represent presentation of video content at a closer zoom (e.g., zoomed in) with text annotation 420. In FIG. 4D, the size of text annotation 420 may not change with the zoom. In FIG. 4D, the size of text annotation 420 may be the same as the size of text annotation 420 in FIG. 4C. In FIG. 4E, the size of text annotation 420 may change with the zoom. In FIG. 4E, the size of text annotation 420 may the larger than the size of text annotation 420 in FIG. 4C. The increased size of text annotation 420 in FIG. 4E may correspond to the zoom level of video content in FIG. 4E.

Reception component 104A may be configured to determine reception of annotation input based on the location of the user's engagement with touchscreen display 12 and/or other information. Reception component 104A may determine one or more user's engagement with touchscreen display 12 to include annotation input based on the user engaging with touchscreen display 12 during an annotation mode, the user engaging with touchscreen display 12 after interacting with an annotation button, and/or other engagements of the user with touchscreen display 12 to indicate that the user is providing annotation input. The annotation input may define one or more in-frame visual annotations for the video content(s). The annotation input may define one or more visual characteristics of the in-frame visual annotation. Visual characteristics may include one or more of color, size, shape, and/or other visual characteristics.

The annotation input may be received at one or more points within the duration of the video content. The one or more points within the duration may define one or more moments and/or one or more periods within the duration. For example, an annotation input may be received at a moment at which kite 410 is located at lower right visual portion of the video content (shown in FIG. 4A), at a moment at which kite 410 is located at upper left visual portion of the video content (shown in FIG. 4B), within one or more moments and/or periods before, between, and/or after the time period in which kite 410 moves between the lower right and the upper left visual portions of the video content (time period between FIG. 4A and FIG. 4B), and/or other moments and/or periods within the duration of the video content.

As another example, an annotation input may be received at a moment at which a skier is located at upper right visual portion of the video (shown in FIG. 3C), at a moment at which the skier have moved left and down the hill to middle visual portion of the video (shown in FIG. 3D), within one or more moments and/or periods before, between, and/or after the time period in which the skier moves between the upper right and the middle visual portions of the video content (time period between FIG. 3C and FIG. 3D), and/or other moments and/or periods within the duration of the video content.

In some implementations, a moment at which the annotation input is received may correspond to a moment in the duration at which the user paused the video content. For example, the user may manually pause the presentation of the video content on touchscreen display 12 (e.g., at the moments shown in FIGS. 3C, 4A). The user may provide the annotation input via engagement with touchscreen display 12. After the annotation input has been provided, the presentation of the video content on touchscreen display 12 may resume.

In some implementations, reception component 104A may be configured to, in response to the reception of the annotation input, pause the presentation of the video content(s) on touchscreen display 12. For example, at the moments shown in FIGS. 3D, 4B, reception component 104A may receive annotation input. In response to reception of the annotation input, reception component 104A may pause the presentation of video content on touchscreen display 12 such that touchscreen display 12 shows the frame of the moments shown in FIGS. 3D, 4B until the annotation input has been provided. After the annotation input has been provided, the presentation of the video content on touchscreen display 12 may resume. For example, video content may include visuals of three persons in a car. A user may engage with touchscreen display 12 to provide annotation input (e.g., names of the three persons in the car and arrows pointing from the names to the persons). Reception component 104A may pause the presentation of the video content so that the video content pauses at the moment the annotation input is received. After the completion of the annotation input (e.g., indicated by a user engaging with touchscreen display 12 to indicate the annotation input is completed, after a threshold time duration in which no annotation input is received), the presentation of the video content on touchscreen display 12 may resume.

Pausing of the video content by reception component 104A may not pause the video content during a subsequent presentation of the video content. For example, video content may include a duration of thirty seconds. Reception component 104A may pause the presentation of the video content at fifteen-second mark in response to reception of annotation input. A subsequent presentation of the video content may not pause the video content at the fifteen-second mark.

Annotation component 106A may be configured to, in response to the reception of the annotation input, generate one or more in-frame visual annotations. One or more in-frame visual annotations may be generated based on the annotation input and/or other information. Annotation component 106A may generate one or more in-frame visual annotation based on one or more of color, size, shape, and/or other visual characteristics defined by the annotation input.

Figure 5A:
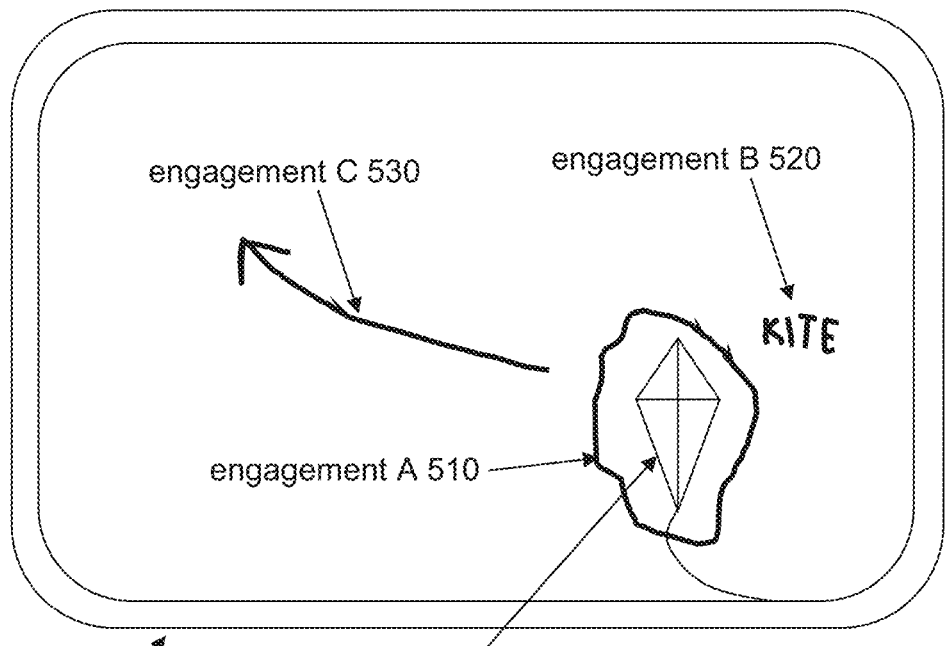
FIG. 5A illustrates exemplary video content presented on a touchscreen display and exemplary user engagements with the touchscreen display.

The user's engagement with touchscreen display 12 may include one or more lines, points, and/or other shapes drawn on touchscreen display 12. FIG. 5A illustrates exemplary video content presented on touchscreen display 12 and exemplary user engagements with touchscreen display 12. Touchscreen display 12 may present a frame of video content at a moment in which kite 410 is located at lower right visual portion of the video content. The user's engagement with touchscreen display 12 may include engagement A 510, engagement B 520, engagement C 530, and/or other user's engagements. Engagement A 510 may include a rough oval drawn around kite 410. Engagement B 520 may include the word "KITE" drawn next to kite 410. Engagement C 530 may include a line drawn from kite 410 to upper left visual portion of the video content.

Figure 5B:
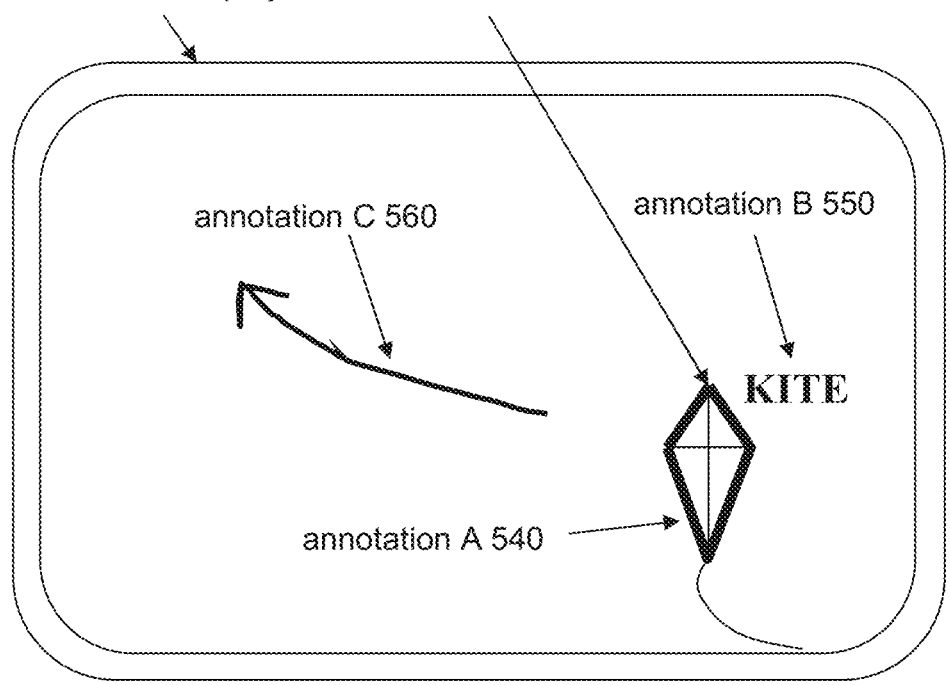
FIGS. 5B-5C illustrate exemplary video content presented with exemplary in-frame visual annotations on a touchscreen display.

FIG. 5B illustrates exemplary video content presented with exemplary in-frame visual annotations. In-frame visual annotations in FIG. 5B may include annotation A 540, annotation B 550, annotation C, 560, and/or other in-frame visual annotations. In some implementations, the in-frame visual annotation(s) may include one or more lines, points, and/or other shapes drawn on touchscreen display 12. For example, the in-frame visual annotation(s) may include one or more user's engagement with touchscreen display as shown in FIG. 5A. Annotation C 560 may include a line/curve drawn on touchscreen display 12. Annotation C 560 may correspond to engagement C 530 shown in FIG. 5A. Other in-frame visual annotations including one or more lines, points, and/or other shapes drawn on touchscreen display 12 are contemplated.

In some implementations, annotation component 106A may improve and/or refine hand-drawn in-frame visual annotations. Annotation component 106A may clean up the lines/shapes drawn by a user such that poor drawing skills of the user may be remedied, i.e., cleaning up the user's "chicken scratches." Annotation component 106A may smooth out hand-drawn squiggly lines, replace hand-drawn shapes (e.g., hand-drawn hat) with graphics (e.g., hat graphic), replace hand-drawn text with formatted text, and/or make other improvements/refinements of hand-drawn in-frame visual annotations. For example, referring to FIGS. 3C and 3E, hand-drawn annotation 360 (e.g., messy hand-writing/drawing (chicken scratch) of person 350) may be cleaned up into text annotation 361 (e.g., "Bob") and line annotation 362 (e.g., arrow).

In some implementations, the in-frame visual annotation(s) may include one or more stock visual elements selected based on one or more lines, points, and/or other shapes drawn on touchscreen display 12, and/or other information. Stock visual elements may refer to one or more texts (of various formats and sizes), lines, shapes, and/or graphics that may replace and/or improve hand-drawn in-frame visual annotations. Stock visual elements may be static or dynamic, and may be observable at a time, over a period of time, at a location, or over a range of locations. Stock visual elements may include one or more of an image, a video, and/or other in-stock visual elements.

Annotation component 106A may match one or more lines, points, and/or other shapes drawn on touchscreen display 12 with one or more stock visual elements (e.g., convert user's engagement with touchscreen display 12 with stock visual elements). Annotation component 106A may include and/or retrieve information (e.g., a database) that matches one or more lines, points, and/or other shapes drawn on touchscreen display 12 to one or more stock visual elements.

Matching user's engagements with one or more stock visual elements may provide a clean-up functionality. For example, one or more user's engagements corresponding to words/numbers drawn on touchscreen display 12 may be converted into words/numbers written in one or more particular fonts. One or more user's engagement corresponding to points/lines/shapes drawn on touchscreen display 12 may be converted into cleaner points/lines/shapes (e.g., having less jitters, less jagged lines, more symmetrical angles) and/or stock arts (e.g., a hat drawn on touchscreen display 12 may be converted into a hat stock art). One or more user's engagements corresponding to outlines drawn on touchscreen display 12 may be converted into more detailed outlines of objects within video content. Other conversion of user's engagements into stock visual elements are contemplated.

For example, in FIG. 5B, annotation B 550 (word "KITE" written in a particular font) may correspond to engagement B 520 (e.g., word "KITE" drawn by hand). Annotation component 106A may detect engagement B 520 and match engagement B 520 with stock visual elements to display the word "KITE" in a particular font. Annotation A 540 (detailed outline of kite 410) may correspond to engagement A 510 (e.g., oval drawn around kite 410) shown in FIG. 5A. Annotation component 106A may detect kite 410 within engagement A 510 and match engagement A 510 with stock visual elements (e.g., straight lines, diamond shape) that more closely outlines kite 410.

In some implementations, one or more in-frame visual annotations may include one or more animations. Animations may refer to visuals that changes in color, size, shape, and/or other visual characteristics with time and/or location. For example, video content may include a person performing a trick on a skateboard. In-frame visual annotations may include a bubble that appears next to the person. The bubble may become larger in size/change in color and include the word "BIG AIR" when the person performs a particular trick.

In some implementations, one or more in-frame visual annotations may include one or more visual effects. A visual effect may refer to one or more changes in visuals presented on touchscreen display 12. One or more visual effects may be associated with one or more in-frame visual annotations at a time, over a period of time, at a location, or over a range of locations. For example, in FIG. 5B, annotation A 540 may include a visual effect that greys out, with the exception of kite 410, the visuals presented on touchscreen display 12. Annotation A 540 may include a visual effect that blurs, with the exception of kite 410, the visuals presented on touchscreen display 12. As another example, in FIG. 3E, text annotation 361 and/or line annotation 362 may cause the skier to appear in color while other portions of the video may be greyed out, and/or may cause the skier to appear in focus while other portions of the video may be blurred. Annotation A 540 may include a visual effect that modifies annotation A 540 at a particular moment/period within the duration of video content and/or at a particular visual portion of the video content (e.g., annotation A 540 may burst into flames at a particular moment within the duration or when it near the upper left visual portion of the video content).

Visual association component 108A may be configured to, in response to the reception of the annotation input, associate one or more in-frame visual annotations with one or more visual portions of the video content(s). Visual portions of video content may be defined by visual dimensions within the video content. For example, particular visual portion of the video content may be defined by a certain X-Y coordinate(s) within the video content (e.g., for a video content having resolution of 1280×720 pixels, a particular visual portion may be defined to be located at X-pixel of 800 and Y-pixel of 600). One or more in-frame visual annotations may be associated with one or more visual portions of the video content(s) based on the location(s) of the user's engagement with touchscreen display 12 and/or other information. For example, based on engagement B 520 (word "KITE" drawn on touchscreen display 12), visual association component 108A may associate annotation B 550 (word "KITE" in a particular font) with one or more X-pixels and one or more Y-pixels of the video content.

One or more visual portions of the video content(s) may include one or more objects. As shown in FIG. 4A, video content presented on touchscreen display 12 may include kite 410, and/or other objects. One or more objects may be moving with the duration of the video content. As shown in FIGS. 4A-4B, kite 410 may move from lower right visual portion to the upper left visual portion of the video content. The object/movement of the object may be determined based on one or more of feature detection, edge detection, optical flow detection, and/or other object/movement detection techniques.

In some implementations, associating one or more in-frame visual annotations with one or more visual portions of the video content(s) may include associating the in-frame visual annotation(s) with one or more object(s). For example, associating annotation A 540 (outline of kite 410) with one or more visual portions of the video content may include associating annotation A 540 with kite 410. In-frame visual annotation(s) may be associated with the object(s) such that the in-frame visual annotation(s) move based on the movement(s) of the object(s) and/or other information.

Figure 5C:
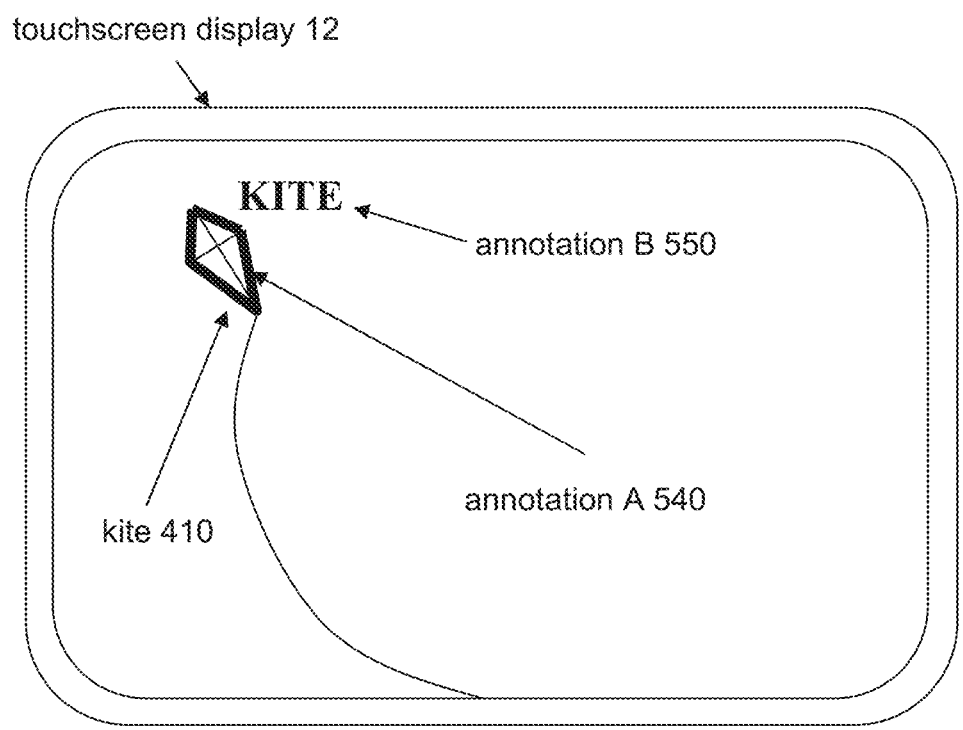

In some implementations, the in-frame visual annotation may be snapped to the object or may follow the object at a distance. For example, as shown in FIGS. 5B-5C, annotation A 540 may move from lower right visual portion to the upper left visual portion of the video content, following the movement of kite 410. In some implementations, the in-frame visual annotation may move based on threshold movement(s) of the object(s). For example, the in-frame visual annotation may move/stop moving once the associated object has moved a threshold distance.

In some implementations, an in-frame visual annotation may be associated with an object such that the in-frame visual annotation appears and disappears based on the appearance/disappearance of the object on touchscreen display 12. For example, kite 410 may move outside the field of view of the video content and may not appear within touchscreen display 12. Annotation B 550 may disappear when kite 410 does not appear within touchscreen display 12. Kite 410 may subsequently move back within the field of view of the video content and may appear within touchscreen display 12. Annotation B 550 may reappear when kite 410 reappears.

In some implementations, one or more objects may have shapes that change within the duration. For example, as shown in FIGS. 4A-4B, the shape of kite 410 may change as kite 410 moves from the lower right visual portion to the upper left visual portion of the video content. The in-frame visual annotation(s) may be associated with the object(s) such that shape(s) of the in-frame visual annotation(s) change based on the shape(s) of the object(s) and/or other information. For example, as shown in FIG. 5C, the shape of annotation A 540 (outline of kite 410) may change with changes in the shape of kite 410.

Time association component 110A may be configured to, in response to the reception of the annotation input, associate one or more in-frame visual annotations with one or more points within the duration of the video content. One or more points within the duration of the video content may correspond to one or more moments and/or periods during which the user provided the annotation input via engagement with touchscreen display 12. One or more points within the duration of the video content may include other moments or periods within the duration of the video content. For example, one or more points within the duration of the video content may include the moment/period during which the user provided the annotation input and additional time subsequent to the moment/period during which the user provided the annotation input. Such association may allow for the in-frame visual annotations to appear at the moment/period during which the corresponding annotation input was received and continue to be presented on touchscreen display 12 subsequent to the completion of the corresponding annotation input.

One or more in-frame visual annotations may be associated with one or more points within the duration such that a subsequent presentation of the video content may include one or more in-frame visual annotations at the one or more points within the duration. One or more in-frame visual annotations may be positioned at the associated visual portion(s) of the video content at the associated point(s) within the duration. For example, in FIG. 5B, annotation C 560 (showing the movement of kite 410) may be associated with a period during which kite 410 moves from lower right visual portion (as shown in FIG. 4A) to upper left visual portion (as shown in FIG. 4B) of the video content. During the period of the movement of kite 410, annotation C 560 may be presented on touchscreen display 12, as shown in FIG. 5B. After the period of movement of kite 410, annotation C 560 may not be presented on touchscreen display 12, as shown in FIG. 5C.

In some implementations, an in-frame visual annotation may be presented with the video content such that the entire in-frame visual annotation is presented at once. For example, at the associated moment/period within the duration of the video content, annotation B 550 (word "KITE" in a particular font) may appear as a single visual element (e.g., word "KITE" appears at fifteen-second mark). In some implementations, an in-frame visual annotation may be presented with the video content such that the in-frame visual annotation is presented based on the time duration of the annotation input. For example, engagement B 520 (word "KITE" drawn on touchscreen display 12) may be received over a duration of four seconds. Appearance of annotation B 550 make take the same amount of time as the duration of the annotation input—four seconds. For example, the letter "K" may appear within the 1st second, the letter "I" may appear within the 2nd second, the letter "T" may appear within the 3rd second, and the letter "E" may appear within the 4th second. Other appearance timing of in-frame visual annotations are contemplated.

In some implementations, the in-frame visual annotations may be encoded into the file(s) containing the video content. For example, the video content may be re-encoded to include the in-frame visual annotations as part of the video content. Encoding the visual annotations in the video content may allow for the in-frame visual annotations to be displayed by any visual application capable of playing the video content.

In some implementations, the in-frame visual annotations may be stored separately from the video content. The in-frame visual annotations may be stored in the same file(s) containing the video content but stored separately from the information defining the video content. For example, the in-frame visual annotations may be stored as part of metadata of the file(s) containing the video content. The in-frame visual annotations may be stored in file(s) separate from the file(s) containing the video content. Separately storing the in-frame visual annotations may allow the video content to be played back without the in-frame visual annotations (e.g., by visual applications that do not support the in-frame visual annotations or based on the in-frame visual annotations being turned off in the visual applications).

In some implementations, in-frame visual annotations may be used for/associated with additional processing of video content. For example, people/objects that are annotated with in-frame visual annotations may be identified/tagged through people/object detection. For example, people/object annotated with in-frame visual annotations may be identified via a deep learning technique (e.g., as used by Lumific) that analyzes images and/or videos within one or more media libraries (e.g., image/video libraries within a camera, phone, computer, and/or server location) and identifies duplicate/similar people/objects from the annotated people/objects. The identified people/objects may be tagged with classification information based on the identity of the people/objects, location of video capture, date of video capture, or other parameters relating to video content and/or identified people/objects. In-frame visual annotations may be incorporated into highlight detections. One or more frame(s) of the video content including in-frame visual annotations may be identified as highlight moment(s). One or more frame(s) of the video content including in-frame visual annotations may be identified as in or out points for highlight moment(s). In-frame visual annotations may be used to categorize different portions of the video content. In-frame visual annotations may be used as one or more triggers for audio effects. Other uses of in-frame visual annotations are contemplated.

Referring to FIG. 1B, system 10B may facilitate adding a moving visual element to video content. Machine readable instructions 100B may include one or more of presentation component 102B, generation component 104B, time period component 106B, motion component 108B, and/or other computer program components.

Figure 6A:
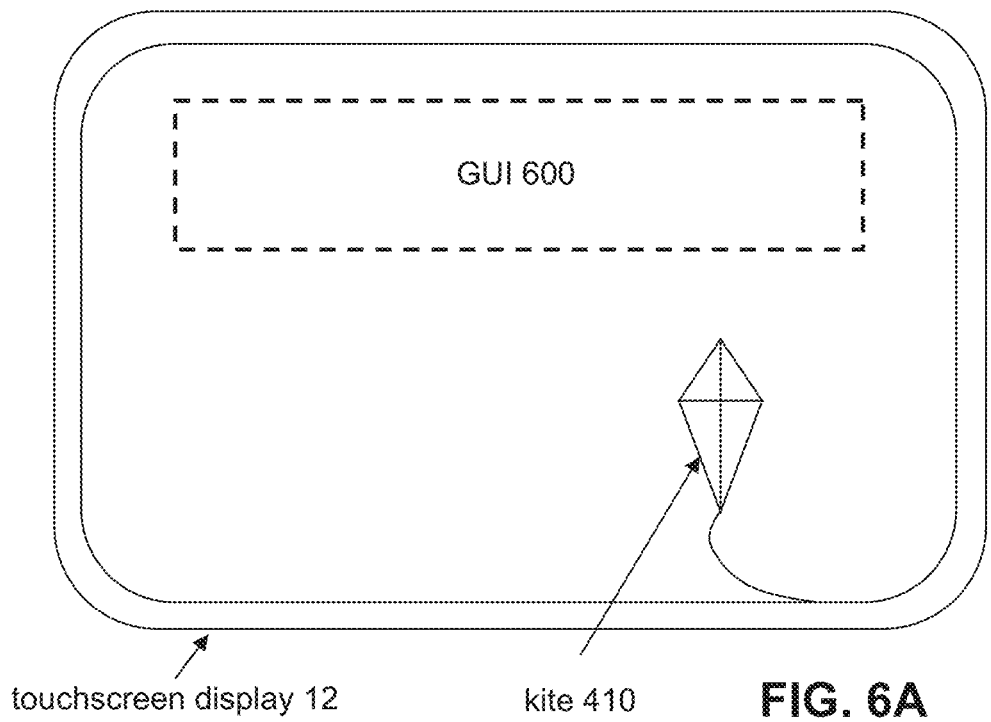
FIGS. 6A-6B illustrate exemplary video content and exemplary graphical user interface presented on a touchscreen display.
Figure 6B:
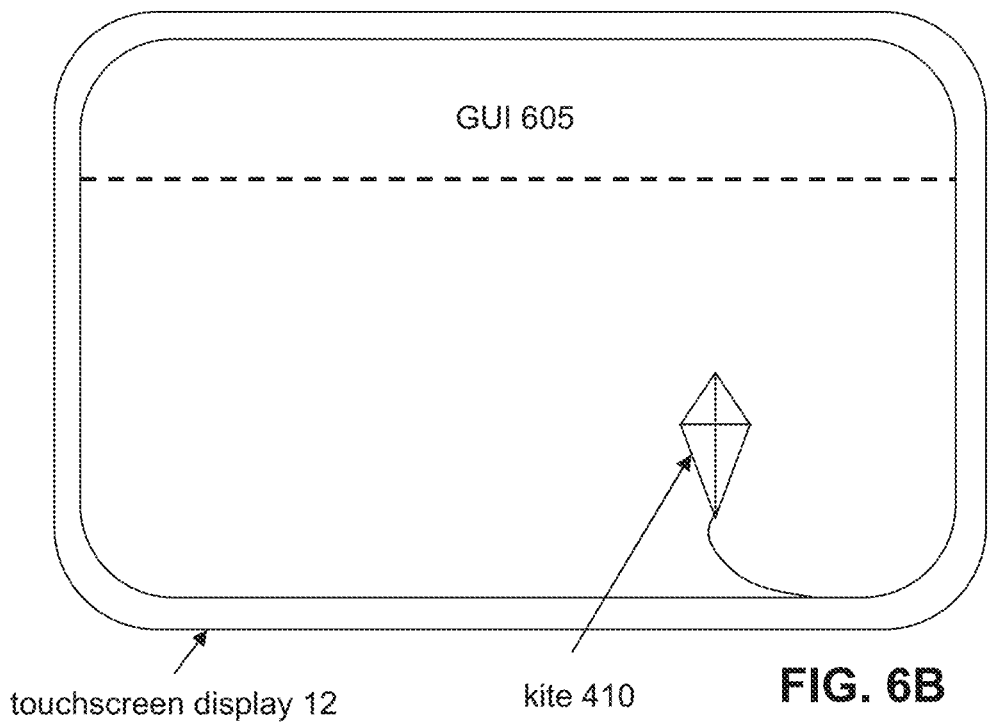

Presentation component 102B may be configured to effectuate presentation of one or more of video content, a graphical user interface, and/or other information on touchscreen display 12. A graphical user interface may refer to a visual interface that allows a user to interact with one or more components within the visual interface. The graphical user interface may be presented with the video content. For example, as shown in FIG. 6A, GUI 600 may be presented on top of video content. The graphical user interface may be presented separately from the video content. For example, as shown in FIG. 6B, GUI 605 may be presented in the top portion of touchscreen display 12 and video content may be presented in the bottom portion of touchscreen display 12. In some implementations, the graphical user interface may be presented separately from the video content by presenting the video content within a smaller area of touchscreen display 12. For example, in FIG. 6B, kite 410 appears smaller than kite 410 in FIG. 6A because video content has been shrunk to be presented in the area of touchscreen display 12 below GUI 605. The graphical user interface (GUI 600, 605) may be always presented on touchscreen display 12 when system 10B is operational or may be presented on touchscreen display 12 based on the context of user operations. For example, GUI 600, 605 may appear when the user indicates that addition of moving visual elements is desired.

In some implementations, video content(s) may include one or more objects. For example, video content may include kite 410 as shown in FIG. 4A. The object(s) may be moving within the duration of the video content. As shown in FIGS. 4A-4B, kite 410 may move from lower right visual portion to the upper left visual portion of the video content. The object(s) may be characterized by one or more movements. For example, kite 410 may be characterized by one or more of translational movements and/or angular movements. As shown in FIGS. 4A-4B, kite 410 may be characterized by translational movements in which kite 410 moves from lower right visual portion to the upper left visual portion of the video content, and angular movements in which kite 410 tilts to the left.

Presentation component 102B may effectuate presentation of one or more moving visual elements with the video content(s). Moving visual elements may refer to one or more moving graphical and/or text elements that may be overlaid on and presented with video content. Moving visual elements may be static or dynamic, and may be observable at a time, over a period of time, at a location, or over a range of locations. Moving visual elements may include one or more of an image, a video, and/or other moving visual elements. In some implementations, moving visual elements may include one or more in-frame visual annotations.

Figures 7A, 7B:
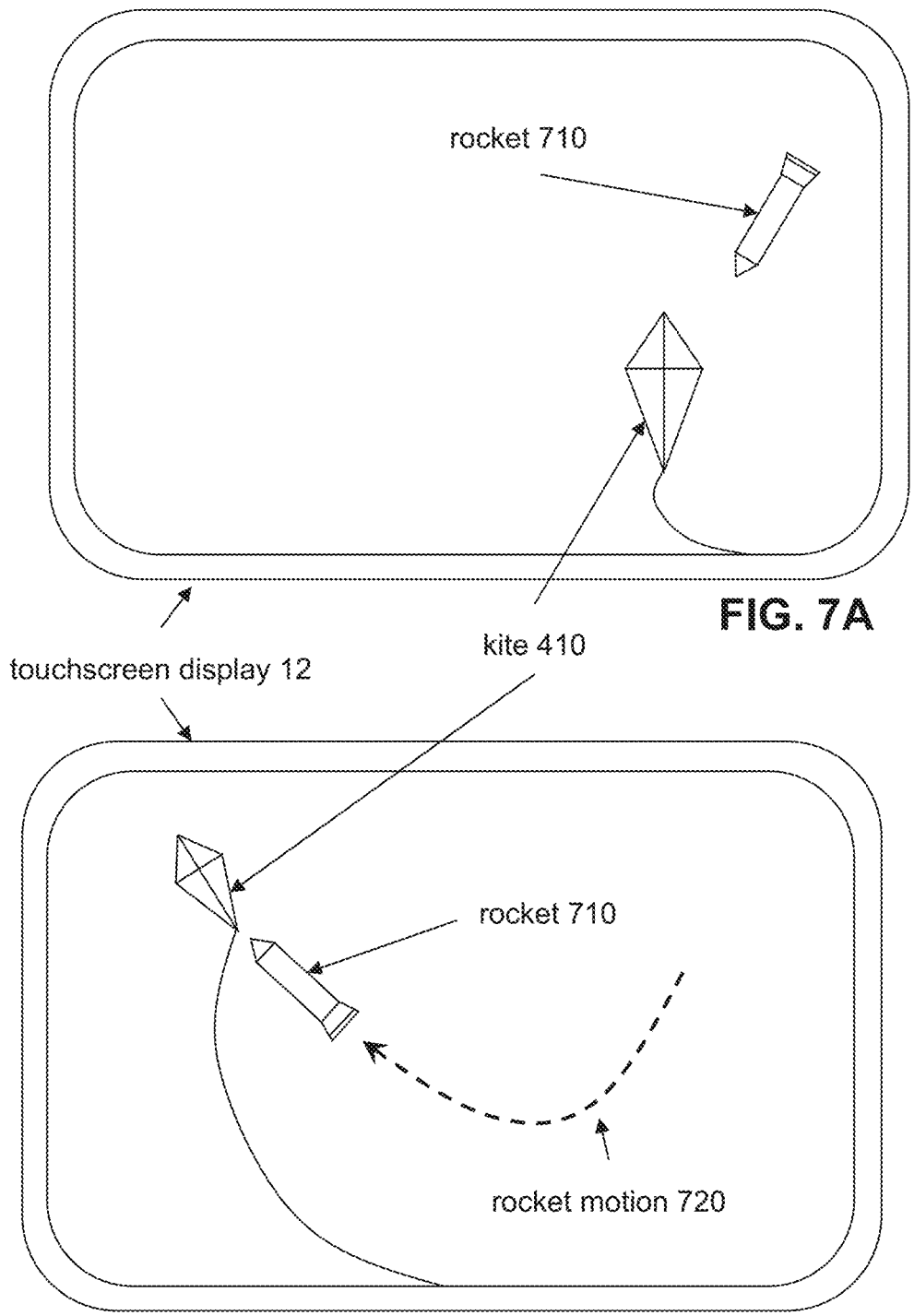
FIGS. 7A-7B illustrate exemplary moving visual elements presented within a duration of video content.

FIGS. 7A-7B illustrate exemplary video content presented with exemplary moving visual elements. In FIG. 7A, touchscreen display 12 may present a frame of video content at a moment in which kite 410 is located at lower right visual portion of the video content. In FIG. 7B, touchscreen display 12 may present a frame of video content at a moment in which kite 410 is located at upper left visual portion of the video content. In FIGS. 7A-7B, moving visual elements may include rocket 710 and/or other moving visual elements. The moving visual elements may be presented at one or more periods within the duration of the video content. For example, as shown in FIGS. 7A-7B, rocket 710 may be presented during the time period in which kite 410 moves between the lower right and the upper left visual portions of the video content (time period between FIG. 4A and FIG. 4B). Rocket 710 may be presented during other time periods. The moving visual elements may be characterized by one or more motions. For example, as shown in FIGS. 7A-7B, rocket 710 may be characterized by rocket motion 720 and/or other motions. Rocket motion 720 may include a leftward motion in which rocket 710 first moves downwards and then upwards. Rocket motion 720 may follow the movement of kite 410. Rocket motion 720 may simulate rocket 710 heading towards kite 410.

A graphical user interface may facilitate interactions of a user with one or more animation fields via the user input. Animation fields may provide one or more options for selection by the user. One or more options may define different properties of a moving visual element added to the video. The options may define one or more of visual characteristics, presentation periods, motions, and/or other properties of the moving visual element.

Figure 8:
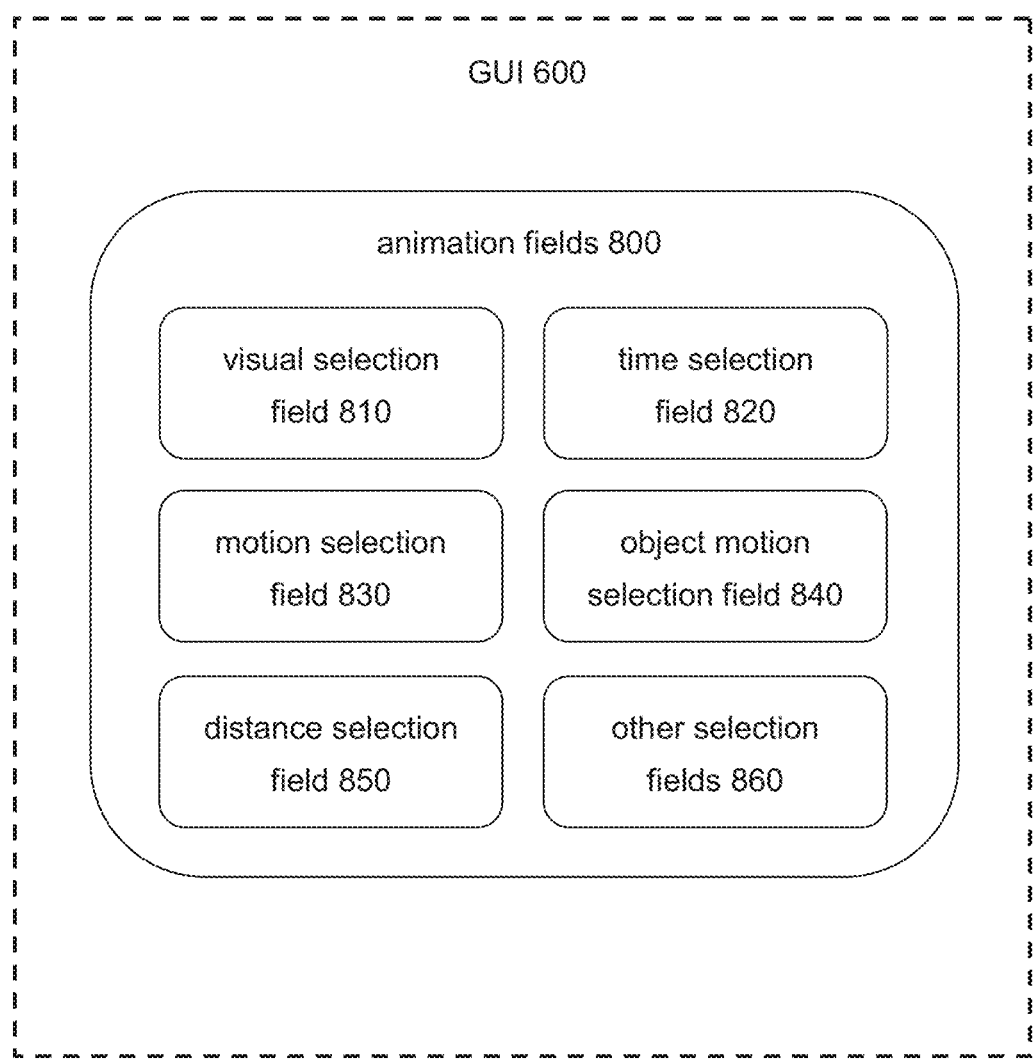
FIG. 8 illustrates exemplary animation fields within a graphical user interface.

FIG. 8 illustrates exemplary animation fields 800 within GUI 600. Animation fields 800 may include one or more of visual selection field 810, time selection field 820, motion selection field 830, and/or other selection fields 860. In some implementations, animation fields 800 may include object motion selection field 840. In some implementations, object motion selection field 840 may be a part of motion selection field 830. In some implementations, animation fields 800 may include distance selection field 850. In some implementations, distance selection field 850 may be a part of object motion selection field 840. Animation fields may include one or more touch interactive components (e.g., buttons, toggles, sliders, bars, graphics) that may change one or more different properties of the moving visual element based on user interactions.

Figure 9A:
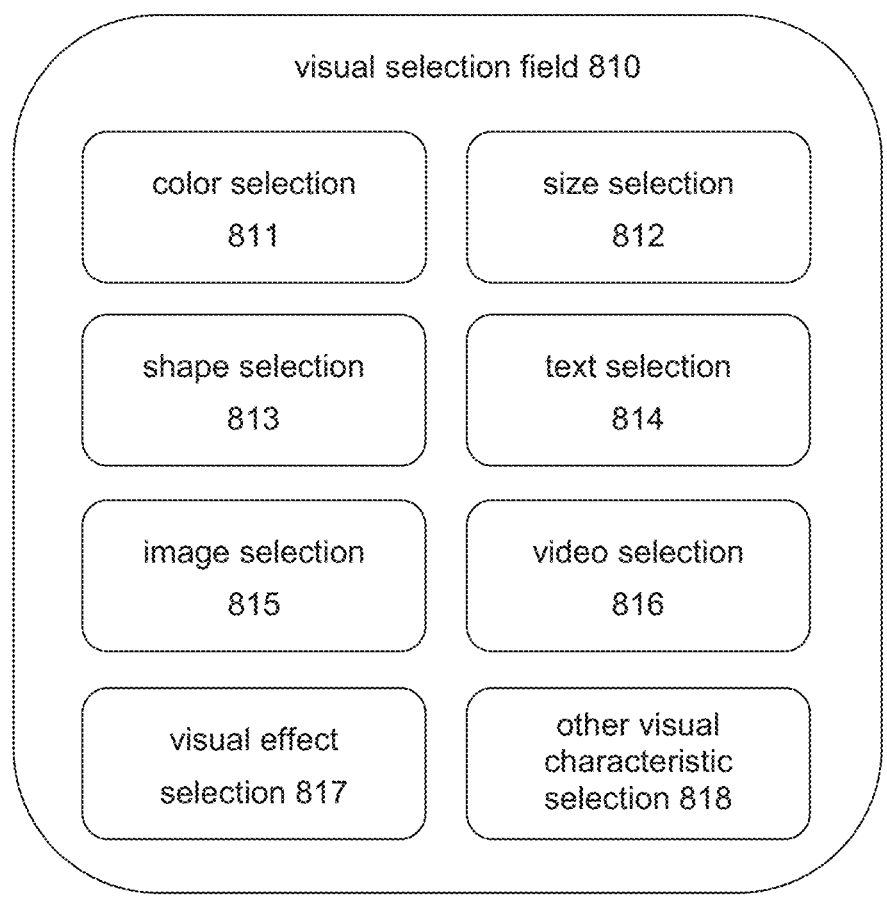
FIG. 9A illustrates an exemplary visual selection field.

Visual selection field 810 may present one or more visual characteristic options for selection by the user. Visual characteristic options may define different visual characteristics for one or more moving visual elements. Visual characteristics may define appearance of one or more moving visual elements. One or more visual characteristics may be static or dynamic. Different visual characteristics for one or more moving visual elements may include one or more of a color, a size, a shape, a text, an image, a video, a visual effect, and/or other visual characteristics. FIG. 9A illustrates exemplary visual characteristic options provided by visual selection field 810.

For example, visual characteristic options may define one or more colors of the moving visual element or one or more colors of tools (e.g., pencil tool, brush tool, spray tool, fill tool) used to define the moving visual element (e.g., color selection 811). Visual characteristic options may define one or more sizes of the moving visual element or one or more sizes of tools (e.g., tip size of pencil tool, tip size of brush tool, spray area of spray tool) used to define the moving visual element (e.g., size selection 812). Visual characteristic options may define one or more shapes of the moving visual element or one or more shapes of tools (e.g., tip shape of pencil tool, tip shape of brush tool, spray shape of spray tool) used to define the moving visual element (e.g., shape selection 813). Visual characteristic options may define one or more texts of the moving visual element or one or more texts of tools (e.g., text tool) used to define the moving visual element (e.g., text selection 814).

Visual characteristic options may define one or more images and/or videos of the moving visual element. For example, visual characteristic options may define one or more images/videos to be included as part of the moving visual element (e.g., image selection 815, video selection 816). Visual characteristic options may define one or more visual effects of the moving visual element. For example, visual characteristic options may define one or more visual effects to be included as part of the moving visual element and/or visual effects triggered by the moving visual element (e.g., visual effect selection 817). Other visual characteristic options (e.g., other visual characteristic selection 818) are contemplated.

Figure 9B:
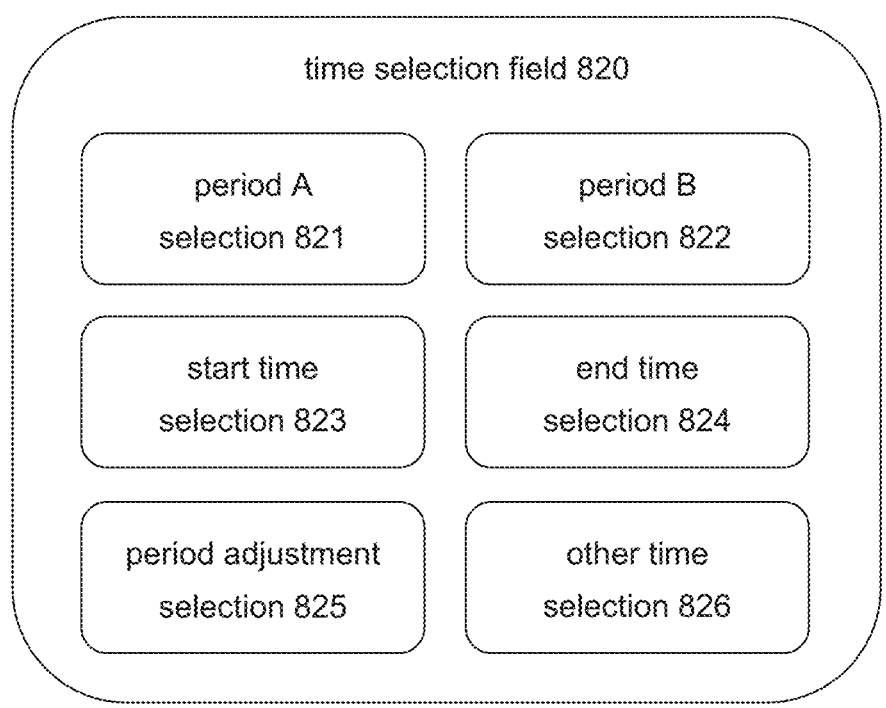
FIG. 9B illustrates an exemplary time selection field.

Time selection field 820 may present one or more time period options for selection by the user. The time period options may define different periods within the duration of video content in which the moving visual element(s) may be presented with the video content. FIG. 9B illustrates exemplary time period options provided by time selection field 820.

For example, the time period options may define one or more start times and one or more end times for the periods during which the moving visual element(s) may be presented (e.g., start at 2.5 second mark, end at 5.2 second mark) (e.g., start time selection 823, end time selection 824). The time period options may define one or more time periods during which the moving visual element(s) may be presented (e.g., present for 12 seconds) (e.g., period A selection 821, period B selection 822). Time period options may allow for adjustment of time periods selected by the user. For example, a user may select a preset time period (e.g., 12 seconds) and manually adjust the time period (e.g., shorten or lengthen the time period) (e.g., period adjustment selection 825).

Time period options may define one or more time periods based on occurrence of one or more events and/or one or more objects within the video content. For example, time period options may define a time period as starting based on occurrences of one or more highlight moments/durations and/or may be defined to include one or more highlight moments/durations. Time period options may define a time period based on appearance/disappearance of one or more objects within the video content. Other time period options (e.g., other time selection 826) are contemplated.

Figure 9C:
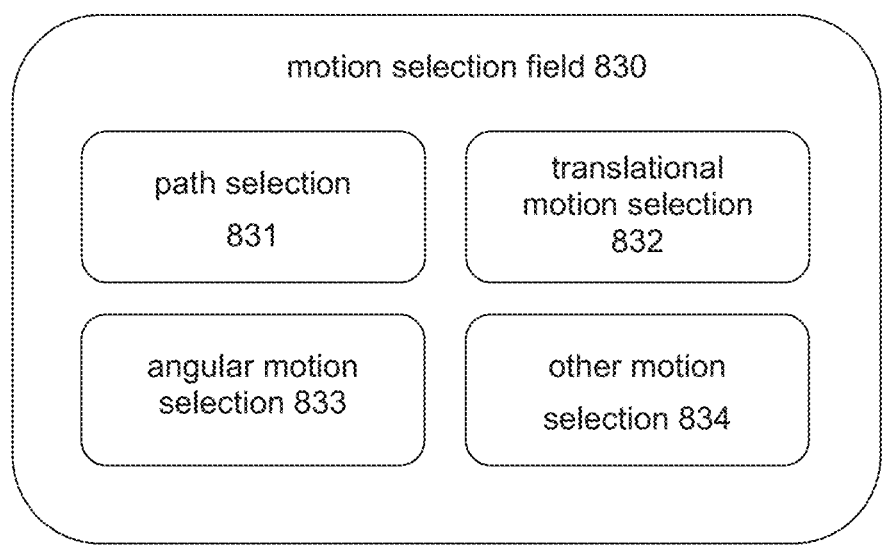
FIG. 9C illustrates an exemplary motion selection field.

Motion selection field 830 may present one or more motion options for selection by the user. The motion options may define different motions for the moving visual element(s). Motions for the moving visual element may characterize how the moving visual element moves within the video content. Motions for the moving visual element may be static or dynamic. FIG. 9C illustrates exemplary motion options provided by motion selection field 830.

For example, motion selection options may include one or both of a predetermined path option and/or a user-determined path option (e.g., path selection 831). A predetermined path option may allow a user to select one or more predetermined paths for the moving visual element. A user-determined path option may allow a user to manually determine the path traveled by the moving visual element (e.g., by drawing on touchscreen display 12 the path of the moving visual element).

Motion selection options may include one or both of a predetermined translational motion option and/or a user-determined translational motion option (e.g., translational motion selection 832). A predetermined translational motion option may allow a user to select one or more predetermined translational motions for the moving visual element. A user-determined translational motion option may allow a user to manually determine one or more translational motions for the moving visual element (e.g., by drawing on touchscreen display 12 the translational motions for the moving visual element).

Motion selection options may include one or both of a predetermined angular motion option and/or a user-determined angular motion option (e.g., angular motion selection 833). A predetermined angular motion option may allow a user to select one or more predetermined angular motions for the moving visual element. A user-determined angular motion option may allow a user to manually determine one or more angular motions for the moving visual element (e.g., by drawing on touchscreen display 12 the angular motions for the moving visual element). Other motions options (e.g., other motion selection 834) are contemplated.

Figure 9D:
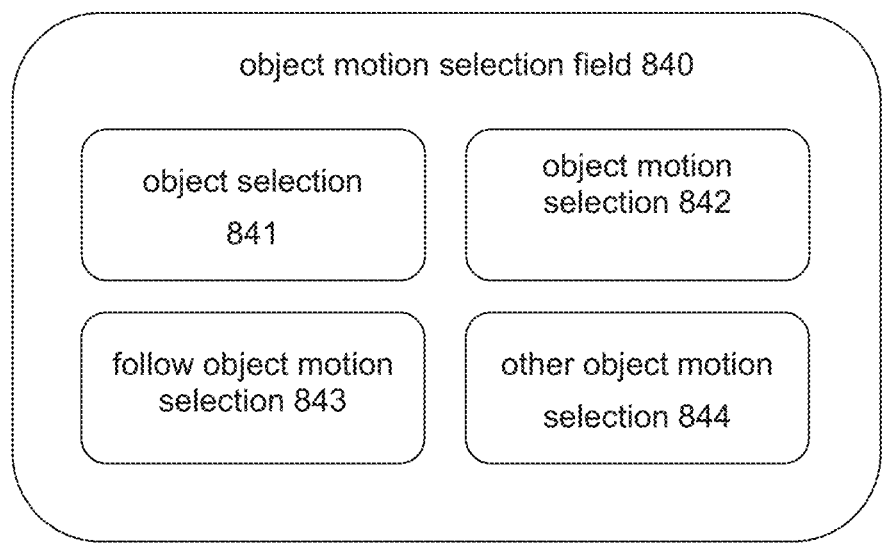
FIG. 9D illustrates an exemplary object motion selection field.

Object motion selection field 840 may present one or more object motion options for selection by the user. The object motion options may define different motions for the moving visual element(s) based on the movement(s) of one or more object(s). FIG. 9D illustrates exemplary object motion options provided by object motion selection field 840.

For example, object motion selection options may include an object selection option (e.g., option selection 841). An object selection option may allow a user to select one or more objects within video content from which the motions for the moving visual element may be determined. For example, touchscreen display 12 may present a frame of video content as shown in FIG. 7A. A user may use the object selection option to select kite 410 as the object from which motions for the moving visual element (e.g., rocket 710) may be determined. Other types of object selections are contemplated.

In some implementations, object motion selection options may include a follow motion selection option (e.g., follow object motion selection 843). A follow motion selection option may allow the motion for the moving visual element to be determined as a motion that follow the selected object. For example, as shown in FIGS. 7A-7B, the follow motion selection option may allow the motion for rocket 710 to be determined as rocket motion 720 that follows kite 410. Other types of follow motions are contemplated.

Figure 9E:
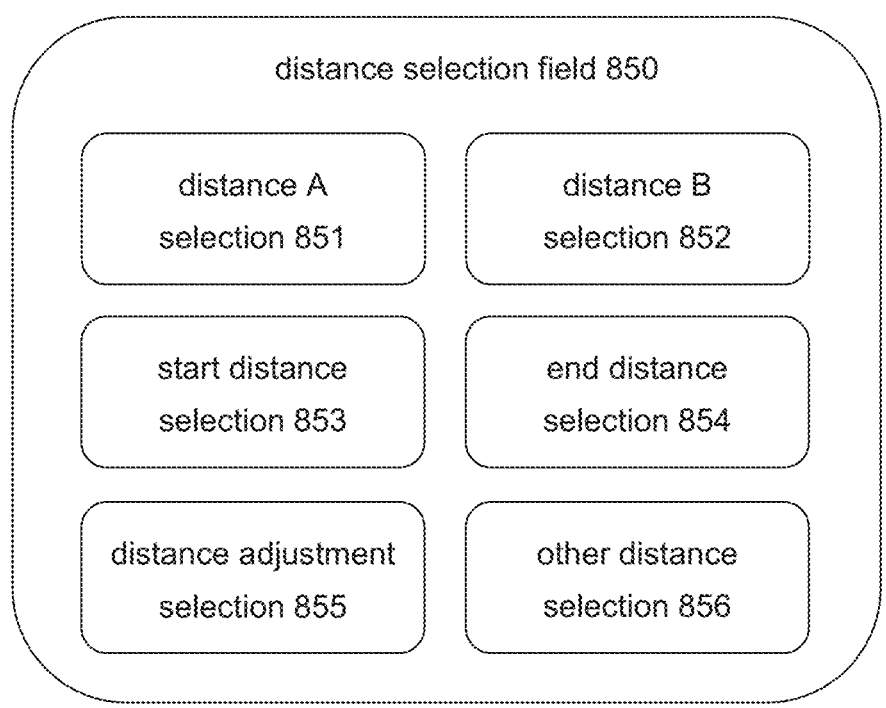
FIG. 9E illustrates an exemplary distance selection field.

Distance selection field 850 may present one or more distance options for selection by the user. The distance options may define different distances at which the moving visual element(s) may follow one or more object(s). FIG. 9E illustrates exemplary distance options provided by distance selection field 850.

For example, the distance options may define one or more start following distances and one or more end following distances for the periods during which the moving visual element(s) may be presented (e.g., start distance selection 853, end distance selection 854). The distance options may define one or more distances from which the moving visual element(s) may follow the object(s) (e.g., distance A selection 851 distance B selection 852).

Figure 9F:
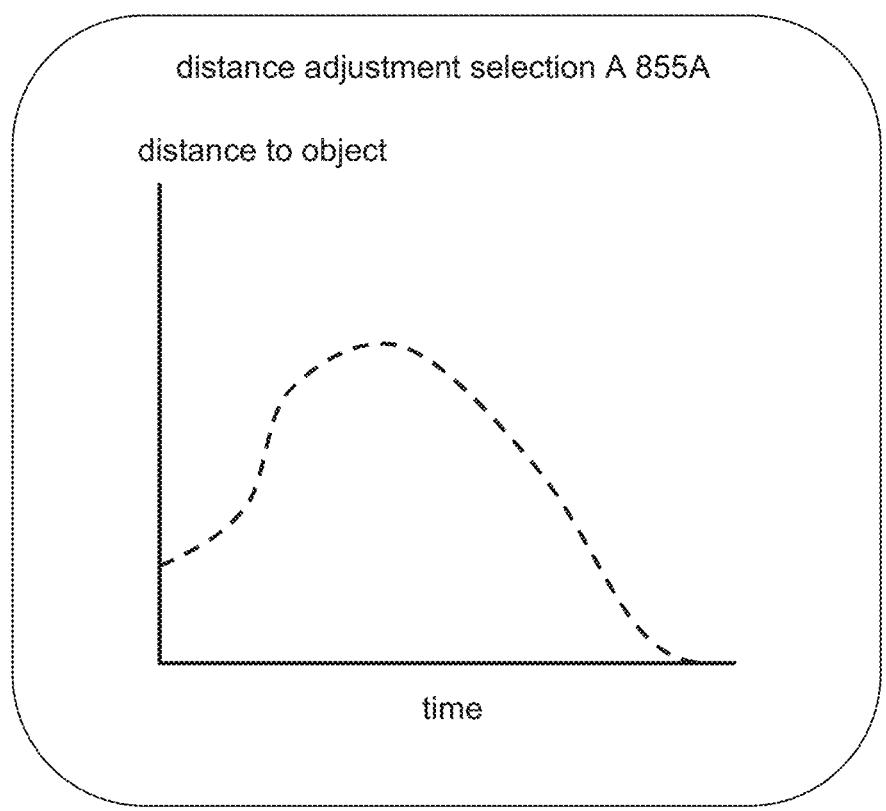
FIG. 9F illustrates an exemplary distance adjustment selection.

Distance options may allow for adjustment of following distances selected by the user. For example, a user may select a preset following distance and manually adjust the following distance (e.g., distance adjustment selection 855). FIG. 9F illustrates exemplary distance adjustment selection A 855A. Distance adjustment selection A 855A may include a graph displaying the following distances as a function of time (time during which the moving visual element(s) may be presented). A user may be able to adjust the following distances by moving the graph up or down. For example, graph as shown in FIG. 9F may correspond to following distances in which the following distances increases and then decreases to zero. For example, with respect to FIGS. 7A-7B, the distances at which rocket 710 may follow kite 410 may initially increase and then decrease until rocket 710 hits kite 410. Other distance options (e.g., other distance selection 856) are contemplated.

Generation component 104B may be configured to generate one or more moving visual elements. One or more moving visual elements may be generated based on one or more visual characteristic options selected by the user and/or other information. For example, generation component 104B may generate moving visual element(s) based on one or more visual characteristic options selected via visual selection field 810, and/or other selection fields 860.

For example, as shown in FIGS. 7A-7B, generation component 104B may generate rocket 710 and/or other moving visual elements based on one or more visual characteristic options selected by the user and/or other information. In some implementations, the moving visual element(s) may include one or more animations. For example, rocket 710 may include a flame animation that changes in size with changes in speed of rocket 710 and/or may include an explosion animation that is triggered when the following distance between rocket 710 and kite 410 reaches zero. Other types of animations are contemplated.

The user's engagement with touchscreen display 12 may include one or more lines, points, and/or other shapes drawn on the touchscreen display. For example, FIG. 3 illustrates exemplary points 310, curve 320, and oval 330 drawn on touchscreen display via the user's engagement with touchscreen display 12. In some implementations, the moving visual element(s) may be generated based on one or more lines, points, and/or other shapes drawn on touchscreen display 12. For example, the moving visual element(s) may include one or more lines, points, and/or other shapes drawn on touchscreen display 12. The moving visual element(s) may include one or more stock visual elements selected based on one or more lines, points, and/or other shapes drawn on touchscreen display 12, and/or other information.

Time period component 106B may be configured to determine one or more periods within the duration in which the moving visual element(s) may be presented with the video content. For example, time period component 106B may determine one or more periods within the duration of video content in which rocket 710 and/or other moving visual elements may be presented with the video content. The period(s) within the duration may be determined based on one or more time period options selected by the user and/or other information. For example, time period component 106B may determine period(s) within the duration in which the moving visual element(s) may be presented with the video content based on one or more time period options selected via time selection field 820, and/or other selection fields 860.

Motion component 108B may be configured to determine one or more motions for the moving visual element(s). For example, motion component 108B may determine one or more motions for rocket 710 and/or other moving visual elements. The motion(s) for the moving visual element(s) may be determined based on one or more motion options selected by the user and/or other information. For example, motion component 108B may determine motion(s) for rocket 710 based on one or more motion options selected via motion selection field 830, object motion selection field 840, distance selection field 850, and/or other selection fields 860.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11, touchscreen display 12, and electronic storage 13 are shown to be connected to an interface 14 in FIGS. 1A-1B, any communication medium may be used to facilitate interaction between any components of system 10A, 10B. One or more components of system 10A, 10B may communicate with each other through hard-wired communication, wireless communication, or both. For example, one or more components of system 10A, 10B may communicate with each other through a network. For example, processor 11 may wirelessly communicate with electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIGS. 1A-1B as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIGS. 1A-1B as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 102A, 104A, 106A, 108A, 110A, 102B, 104B, 106B and/or 108B may be eliminated, and some or all of its functionality may be provided by other computer program components. As another example, processor 11 may be configured to execute one or more additional computer program components that may perform some or all of the functionality attributed to one or more of computer program components 102A, 104A, 106A, 108A, 110A, 102B, 104B, 106B and/or 108B described herein.

The electronic storage media of electronic storage 13 may be provided integrally (i.e., substantially non-removable) with one or more components of system 10A, 10B and/or removable storage that is connectable to one or more components of system 10A, 10B via, for example, a port (e.g., a USB port, a Firewire port) or a drive (e.g., a disk drive). Electronic storage 13 may include one or more of optically readable storage media (e.g., optical disks), magnetically readable storage media (e.g., magnetic tape, magnetic hard drive, floppy drive), electrical charge-based storage media (e.g., EPROM, EEPROM, RAM), solid-state storage media (e.g., flash drive), and/or other electronically readable storage media. Electronic storage 13 may be a separate component within system 10A, 10B, or electronic storage 13 may be provided integrally with one or more other components of system 10A, 10B (e.g., processor 11). Although electronic storage 13 is shown in FIGS. 1A-1B as a single entity, this is for illustrative purposes only. In some implementations, electronic storage 13 may comprise a plurality of storage units. These storage units may be physically located within the same device, or electronic storage 13 may represent storage functionality of a plurality of devices operating in coordination.

Figure 2A:
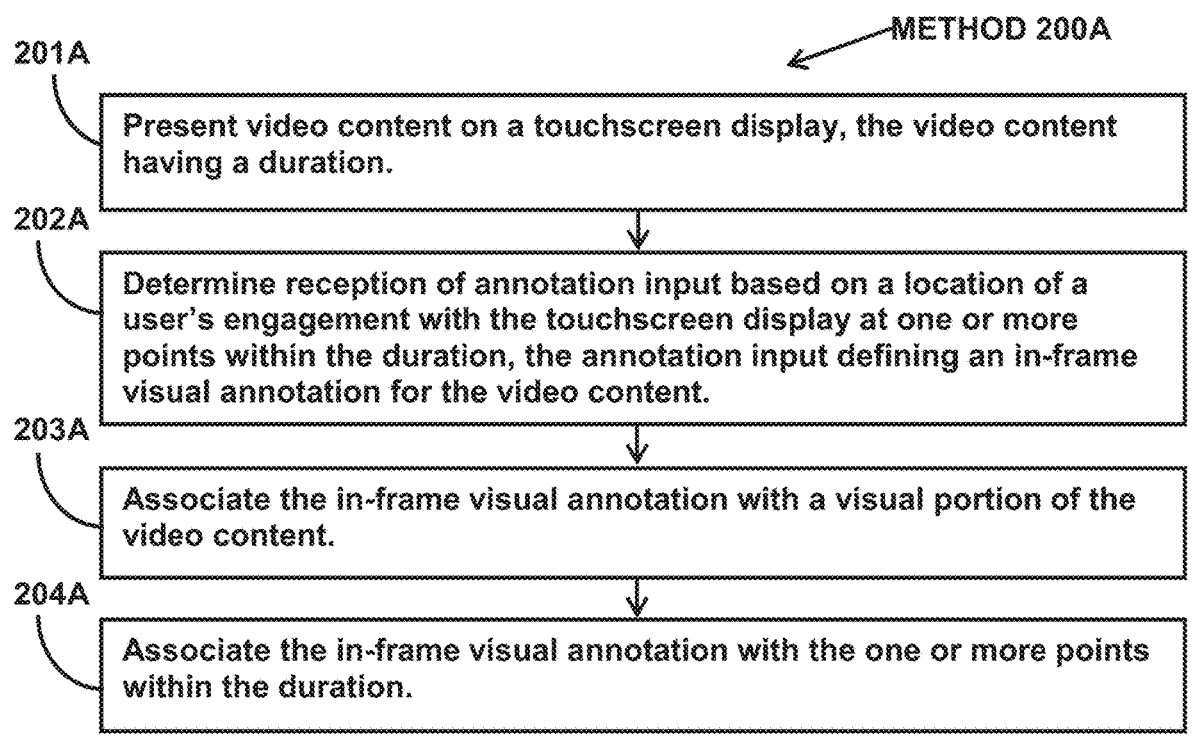
FIG. 2A illustrates a method for annotating video content.
Figure 2B:
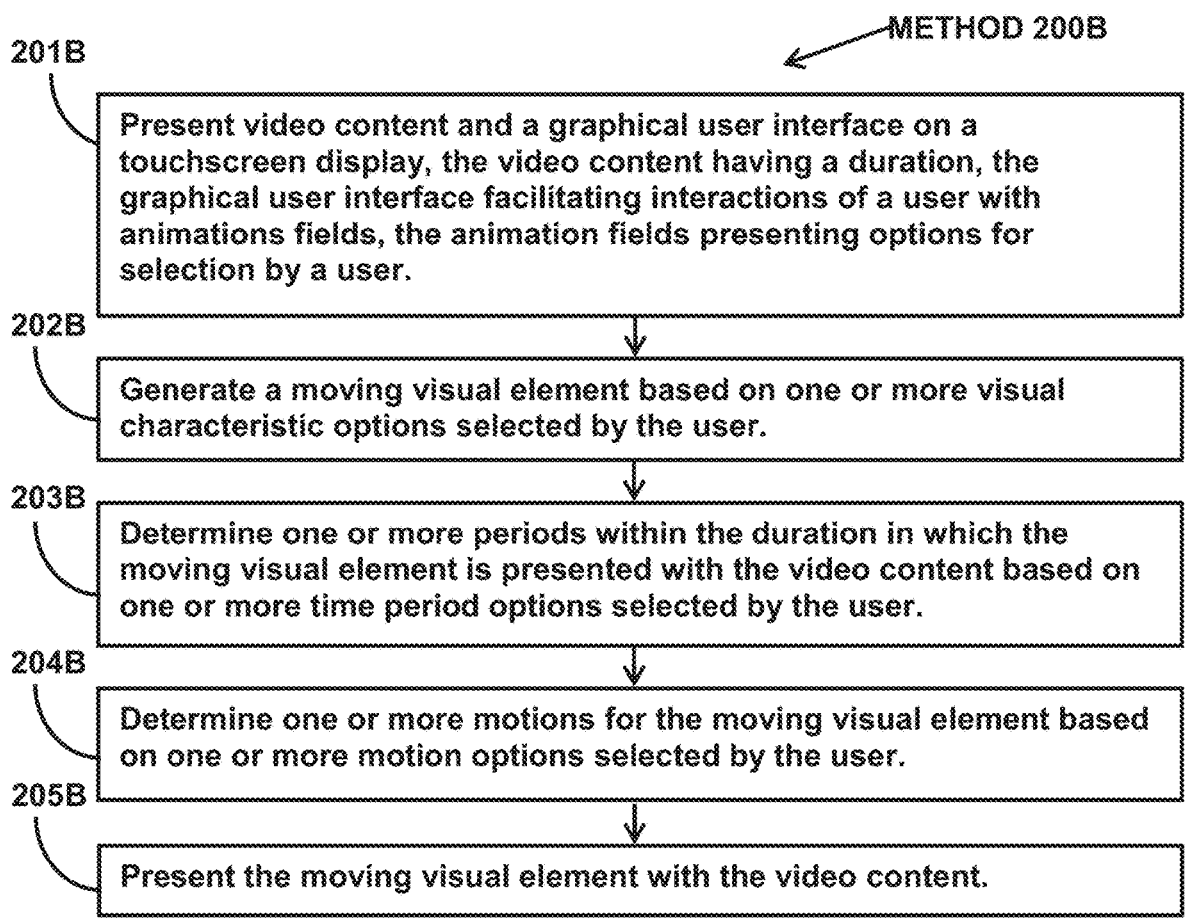
FIG. 2B illustrates a method for adding a moving visual element to video content.

FIG. 2A illustrates method 200A for annotation video content. FIG. 2B illustrates method 200B for adding a moving visual element to video content. The operations of method 200A, 200B presented below are intended to be illustrative. In some implementations, method 200A, 200B may be accomplished with one or more additional operations not described, and/or without one or more of the operations discussed. In some implementations, two or more of the operations may occur substantially simultaneously.

In some implementations, method 200A, 200B may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200A, 200B in response to instructions stored electronically on one or more electronic storage mediums. The one or more processing devices may include one or more devices configured through hardware, firmware, and/or software to be specifically designed for execution of one or more of the operations of method 200A, 200B.

Referring to FIG. 2A and method 200A, at operation 201A, video content may be presented on a touchscreen display. The video content may have a duration. In some implementations, operation 201A may be performed by a processor component the same as or similar to presentation component 102A (shown in FIG. 1A and described herein).

At operation 202A, reception of annotation input may be determined. Reception of annotation input may be determined based on a location of a user's engagement with the touchscreen display at one or more points within the duration. The annotation input may define an in-frame visual annotation for the video content. In some implementations, operation 202A may be performed by a processor component the same as or similar to reception component 104A (shown in FIG. 1A and described herein).

At operation 203A, the in-frame visual annotation may be associated with a visual portion of the video content. In some implementations, operation 203A may be performed by a processor component the same as or similar to visual association component 108A (shown in FIG. 1A and described herein).

At operation 204A, the in-frame visual annotation may be associated with the one or more points within the duration. In some implementations, operation 204A may be performed by a processor component the same as or similar to time association component 110A (shown in FIG. 1A and described herein).

Referring to FIG. 2B and method 200B, at operation 201B, video content and a graphical user interface may be presented on a touchscreen display. The video content may have a duration. The graphical user interface may facilitate interactions of a user with animation fields. The animation fields may present options for selection by a user. In some implementations, operation 201A may be performed by a processor component the same as or similar to presentation component 102B (shown in FIG. 1B and described herein).

At operation 202B, a moving visual element may be generated. The moving visual element may be generated based on one or more visual characteristic options selected by the user. In some implementations, operation 202B may be performed by a processor component the same as or similar to generation component 104B (shown in FIG. 1B and described herein).

At operation 203B, one or more periods within the duration in which the moving visual element may be presented with the video content may be determined. The one or more periods may be determined based on one or more time period options selected by the user. In some implementations, operation 203B may be performed by a processor component the same as or similar to time period component 166E (shown in FIG. 1B and described herein).

At operation 204B, one or more motions for the moving visual element may be determined. The one or more motions may be determined based on one or more motion options selected by the user. In some implementations, operation 204B may be performed by a processor component the same as or similar to motion component 108B (shown in FIG. 1B and described herein).

At operation 205B, the moving visual element may be presented with the video content. In some implementations, operation 205B may be performed by a processor component the same as or similar to presentation component 102B (shown in FIG. 1B and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for annotating a video, the system comprising:
    a touchscreen display configured to present video content and generate output signals based on a user's engagement with the touchscreen display during the presentation of the video content, the video content having a duration; and
    one or more physical processors configured by machine-readable instructions to:
        effectuate presentation of the video content on the touchscreen display;
        determine content of an in-frame visual annotation for the video content based on the output signals;
        associate the in-frame visual annotation with a visual portion of the video content corresponding to a location of the user's engagement with the touchscreen display; and
        associate the in-frame visual annotation with one or more points within the duration such that a subsequent presentation of the video content includes the in-frame visual annotation positioned at the visual portion of the video content at the one or more points within the duration.

2. The system of claim 1, wherein the one or more processors are further configured by machine-readable instruction to pause the presentation of the video content on the touchscreen display based on the user's engagement with the touchscreen display.

3. The system of claim 1, wherein the one or more points within the duration defines a moment or a period within the duration.

4. The system of claim 1, wherein the in-frame visual annotation includes an animation.

5. The system of claim 1, wherein the in-frame visual annotation includes a visual effect.

6. The system of claim 1, wherein the visual portion of the video content includes an object, the object moving within the duration, and associating the in-frame visual annotation with the visual portion of the video content includes associating the in-frame visual annotation with the object such that the in-frame visual annotation moves based on the movement of the object.

7. The system of claim 1, wherein the visual portion of the video content includes an object, the object having a first shape that changes within the duration, and associating the in-frame visual annotation with the visual portion of the video content includes associating the in-frame visual annotation with the object such that a second shape of the in-frame visual annotation changes based on the first shape.

8. The system of claim 1, wherein the user's engagement with the touchscreen display includes one or more lines and/or points drawn on the touchscreen display and the content of the in-frame visual annotation includes the one or more lines and/or points.

9. The system of claim 1, wherein the user's engagement with the touchscreen display includes one or more lines and/or points drawn on the touchscreen display and the content of the in-frame visual annotation includes one or more stock visual elements selected based on the one or more lines and/or points.

10. A method for annotating a video, the method performed by a computing system including one or more physical processors, the method comprising:
  presenting, by the computing system, video content on a touchscreen display, the video content having a duration, the touchscreen display configured to present the video content and generate output signals based on a user's engagement with the touchscreen display during the presentation of the video content;
  determining, by the computing system, content of an in-frame visual annotation for the video content based on the output signals;
  associating, by the computing system, the in-frame visual annotation with a visual portion of the video content corresponding to a location of the user's engagement with the touchscreen display; and
  associating, by the computing system, the in-frame visual annotation with one or more points within the duration such that a subsequent presentation of the video content includes the in-frame visual annotation positioned at the visual portion of the video content at the one or more points within the duration.

11. The method of claim 10, further comprising pausing, by the computing system, the presentation of the video content on the touchscreen display based on the user's engagement with the touchscreen display.

12. The method of claim 10, wherein the one or more points within the duration defines a moment or a period within the duration.

13. The method of claim 10, wherein the in-frame visual annotation includes an animation.

14. The method of claim 10, wherein the in-frame visual annotation includes a visual effect.

15. The method of claim 10, wherein the visual portion of the video content includes an object, the object moving within the duration, and associating the in-frame visual annotation with the visual portion of the video content includes associating the in-frame visual annotation with the object such that the in-frame visual annotation moves based on the movement of the object.

16. The method of claim 10, wherein the visual portion of the video content includes an object, the object having a first shape that changes within the duration, and associating the in-frame visual annotation with the visual portion of the video content includes associating the in-frame visual annotation with the object such that a second shape of the in-frame visual annotation changes based on the first shape.

17. The method of claim 10, wherein the user's engagement with the touchscreen display includes one or more lines and/or points drawn on the touchscreen display and the content of the in-frame visual annotation includes the one or more lines and/or points.

18. The method of claim 10, wherein the user's engagement with the touchscreen display includes one or more lines and/or points drawn on the touchscreen display and the content of the in-frame visual annotation includes one or more stock visual elements selected based on the one or more lines and/or points.

19. A system for annotating a video, the system comprising:
  a touchscreen display configured to present video content and generate output signals based on a user's engagement with the touchscreen display during the presentation of the video content, the video content having a duration; and
  one or more physical processors configured by machine-readable instructions to:
    effectuate presentation of the video content on the touchscreen display;
    determine content of an in-frame visual annotation for the video content based on the output signals;
    associate the in-frame visual annotation with a visual portion of the video content corresponding to a location of the user's engagement with the touchscreen display; and
    associate the in-frame visual annotation with one or more points within the duration corresponding to time of the user's engagement with the touchscreen display, the one or more points within the duration defining a moment or a period within the duration, such that a subsequent presentation of the video content includes the in-frame visual annotation positioned at the visual portion of the video content at the one or more points within the duration.

20. The system of claim 19, wherein the user's engagement with the touchscreen display includes one or more lines and/or points drawn on the touchscreen display and the content of the in-frame visual annotation includes one or more stock visual elements selected based on the one or more lines and/or points.

* * * * *